United States Patent
Kutz et al.

(10) Patent No.: US 11,581,984 B2
(45) Date of Patent: Feb. 14, 2023

(54) RETRANSMISSION TECHNIQUE WITH COMPRESSED FEEDBACK IN A WIRELESS COMMUNICATION SYSTEM

(71) Applicant: QUALCOMM Incorporated, San Diego, CA (US)

(72) Inventors: Gideon Shlomo Kutz, Ramat Hasharon (IL); Tal Oved, Modiin (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/315,074

(22) Filed: May 7, 2021

(65) Prior Publication Data

US 2022/0360370 A1 Nov. 10, 2022

(51) Int. Cl.
| | | |
|---|---|---|
| *H04L 1/18* | (2006.01) | |
| *H04L 1/00* | (2006.01) | |
| *H04L 1/1812* | (2023.01) | |

(52) U.S. Cl.
CPC .......... *H04L 1/1819* (2013.01); *H04L 1/0057* (2013.01)

(58) Field of Classification Search
None
See application file for complete search history.

(56) References Cited

U.S. PATENT DOCUMENTS

| | | | | |
|---|---|---|---|---|
| 2010/0241859 A1* | 9/2010 | Osmolovsky | ......... | H04L 1/0009 713/170 |
| 2011/0080975 A1* | 4/2011 | Toda | ..................... | H04L 1/1887 375/295 |
| 2018/0270023 A1 | 9/2018 | Jiang et al. | | |
| 2018/0287744 A1 | 10/2018 | Sundararajan et al. | | |
| 2020/0259600 A1* | 8/2020 | Cao | .................... | H04W 72/1289 |
| 2021/0075554 A1 | 3/2021 | Levy et al. | | |

OTHER PUBLICATIONS

International Search Report and Written Opinion—PCT/US2022/020562—ISA/EPO—dated Jun. 9, 2022.
Lenovo, et al., "Discussion on Enhanced HARQ Feedback and CBG-based Partial Retransmission," 3GPP TSG RAN WG1 Meeting #88bis, R1-1705653, Apr. 3-7, 2017, 5 pages, XP051243774, Retrieved from the Internet: URL: http://www.3gpp.org/ftp/Meetings_3GPP_SYNC/RAN1/Docs/ [Retrieved on Apr. 2, 2017] p. 1-p. 4, figure 1.

* cited by examiner

*Primary Examiner* — Walter J Divito
(74) *Attorney, Agent, or Firm* — Holland & Hart LLP

(57) ABSTRACT

This disclosure provides systems, methods, and apparatus, including computer programs encoded on computer-readable media, for a retransmission protocol that utilizes compressed feedback. Various implementations relate generally to a compressed feedback technique for hybrid automatic repeat request (HARQ). Upon receiving a compressed feedback value, a sending device may generate a retransmission codeblock. The retransmission codeblock may be derived from multiple codeblocks in a set of codeblocks. A receiving device can use the retransmission codeblock to obtain any failed codeblock in the set of codeblocks based on all other previously decoded codeblocks in the set of codeblocks. Thus, the receiving device does not need to indicate which codeblock in the set failed, but only needs to send a compressed feedback value that indicates which sets of codeblocks have had a single codeblock failure.

28 Claims, 17 Drawing Sheets

FEEDBACK GROUP SIZE OF FOUR
(FOUR CODEBLOCKS PER COMPRESSED FEEDBACK VALUE)

| POSSIBLE DECODING RESULTS | | | | RAW FB BITMAP | COMP. FB VALUE | NEXT TRANSMISSION (RETRANSMISSION FUNCTIONS) | HARQ OPERATION (RECEIVER FUNCTIONS) | | |
|---|---|---|---|---|---|---|---|---|---|
| CB A | CB B | CB C | CB D | | | | | | |
| A | B | C | D | 0000 | 0 | | | | |
| A | FAIL | C | D | 0100 | 1 | XOR{ABCD} | R{-ACD} | | |
| FAIL | B | C | D | 1000 | 1 | XOR{ABCD} | R{-BCD} | | |
| A | B | C | FAIL | 0001 | 1 | XOR{ABCD} | R{-ABC} | | |
| A | B | FAIL | D | 0010 | 1 | XOR{ABCD} | R{-ABD} | | |
| FAIL | FAIL | C | D | 1100 | 2 | XOR{AC} | R{-C} | R{-D} | |
| A | B | FAIL | FAIL | 0011 | 2 | XOR{AC} | R{-A} | R{-B} | |
| FAIL | B | C | FAIL | 0101 | 3 | XOR{AB} | R{-A} | R{-C} | |
| A | FAIL | FAIL | D | 1001 | 3 | XOR{AB} | R{-B} | R{-C} | |
| FAIL | B | FAIL | D | 1010 | 3 | XOR{AB} | R{-A} | R{-D} | |
| A | FAIL | C | FAIL | 0110 | 3 | XOR{AB} | R{-B} | R{-D} | |
| FAIL | FAIL | FAIL | D | 1101 | 4 | RTX CB "A" | RTX CB "B" | XOR{CD} | N/A |
| FAIL | FAIL | C | FAIL | 1110 | 4 | RTX CB "A" | RTX CB "B" | XOR{CD} | N/A |
| A | FAIL | FAIL | FAIL | 0111 | 5 | XOR{AB} | RTX CB "C" | RTX CB "D" | R{-A} |
| FAIL | B | FAIL | FAIL | 1011 | 5 | XOR{AB} | RTX CB "C" | RTX CB "D" | R{-B} |
| FAIL | FAIL | FAIL | FAIL | 1111 | 6 | RTX CB "A" | RTX CB "B" | RTX CB "C" | RTX CB "D" |

900

TRADITIONAL FEEDBACK BITMAP REQUIRES SIXTEEN DISTINCT FEEDBACK STATES

COMPRESSED FEEDBACK USES SEVEN DISTINCT FEEDBACK STATES

*FIGURE 9*

RETRANSMISSION TECHNIQUE WITH COMPRESSED FEEDBACK IN A WIRELESS COMMUNICATION SYSTEM

TECHNICAL FIELD

Aspects of the present disclosure relate generally to wireless communication and a retransmission protocol in a wireless communication system.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). A wireless communication system may include one or more base stations (BSs) or one or more network access nodes, each simultaneously supporting communication for multiple communication devices, which may be otherwise known as user equipment (UE).

A wireless communication between two wireless communication devices (such between a base station and a UE) may be susceptible to interference or other challenges which impair the wireless communication medium. To mitigate such impairments, a sender may select a coding scheme based on channel conditions. Furthermore, a wireless transmission may be encoded to include error checking and redundancy information that enables a receiver to detect and sometimes correct errors in the wireless transmission. The receiver may send a feedback message (including an acknowledgment or negative acknowledgment) to the sender to indicate whether the data was successfully received. Based on the feedback message, the sender may select a different coding scheme, may send a retransmission to assist the receiver in decoding the data, or both. Some retransmission protocols aim to balance the benefits of a faster coding scheme with the loss in effective data rate that results from excessive retransmissions.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication. The method may be performed by a first device in a wireless communication system. The method may include transmitting, from the first device to a second device, a first transmission that includes at least a first plurality of codeblocks. The method may include receiving, from the second device, a feedback message that includes at least a first compressed feedback value based on decoding results of a first feedback group of codeblocks. The method may include generating one or more retransmission codeblocks based on the first compressed feedback value. At least one retransmission codeblock may be generated based on a reversible combination of more than one codeblock of the first feedback group of codeblocks. The method may include transmitting, from the first device to the second device, a second transmission that includes the one or more retransmission codeblocks.

Another innovative aspect of the subject matter described in this disclosure can be implemented in a method of wireless communication. The method may be performed by a second device of the wireless communication system. The method may include receiving, from a first device, a first transmission that includes at least a first plurality of codeblocks. The method may include attempting to decode the first plurality of codeblocks. The method may include transmitting, to the first device, a feedback message that includes at least a first compressed feedback value based on decoding results of a first feedback group of codeblocks. The method may include receiving, from the first device, a second transmission that includes one or more retransmission codeblocks based on the one or more retransmission functions. At least one retransmission codeblock may be based on a reversible combination of more than one codeblock of the first feedback group of codeblocks.

Another innovative aspect of the subject matter described in this disclosure can be implemented in an apparatus of a first device. The apparatus may include at least one modem configured to output a first transmission that includes at least a first plurality of codeblocks. The at least one modem may be configured to obtain, from the second device, a feedback message that includes at least a first compressed feedback value based on decoding results of a first feedback group of codeblocks. The apparatus may include a processing system configured to generate one or more retransmission codeblocks based on the first compressed feedback value. At least one retransmission codeblock may be generated based on a reversible combination of more than one codeblock of the first feedback group of codeblocks. The at least one modem may be configured to output, to the second device, a second transmission that includes the one or more retransmission codeblocks.

Another innovative aspect of the subject matter described in this disclosure can be implemented in an apparatus of a second device. The apparatus may include at least one modem configured to obtain, from a first device, a first transmission that includes at least a first plurality of codeblocks. The apparatus may include a processing system configured to attempt to decode the first plurality of codeblocks. The at least one modem may be configured to output, to the first device, a feedback message that includes at least a first compressed feedback value based on decoding results of a first feedback group of codeblocks. The at least one modem configured may be to obtain, from the first device, a second transmission that includes one or more retransmission codeblocks based on the one or more retransmission functions. At least one retransmission codeblock may be based on a reversible combination of more than one codeblock of the first feedback group of codeblocks.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 9 depicts a table in which a compressed feedback is used with a feedback group size of four codeblocks.

Like reference numbers and designations in the various drawings indicate like elements.

DETAILED DESCRIPTION

Figure 1:
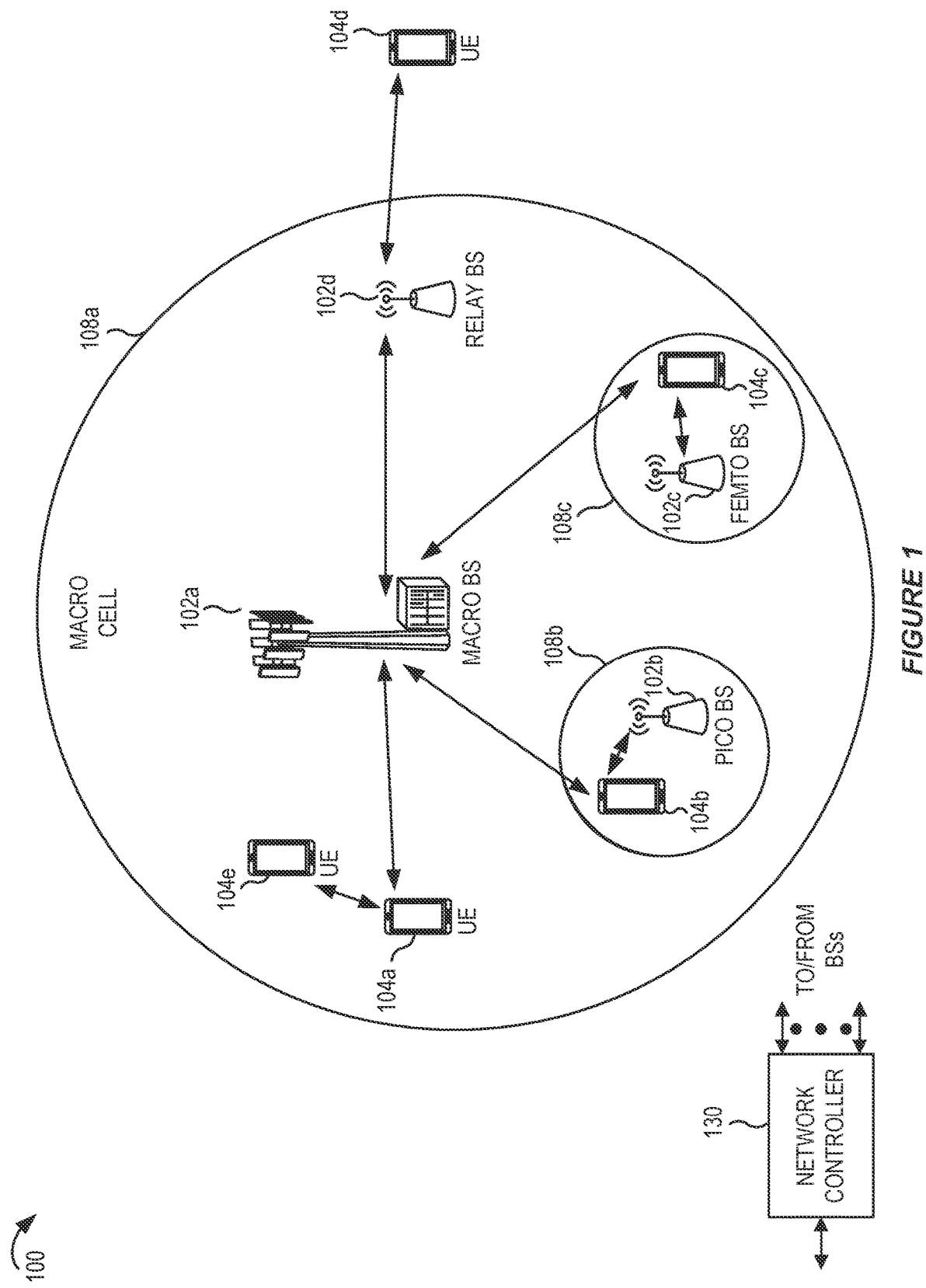
FIG. 1 shows a block diagram conceptually illustrating an example of a wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth© standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

To mitigate interference or other challenges impairing a wireless communication medium, wireless communication devices (sometimes referred to as "devices" for brevity) may implement a retransmission protocol. An example of a retransmission protocol is Hybrid Automatic Repeat Request (HARQ). The devices may implement HARQ protocols to improve throughput, reliability of wireless communication, or both. For clarity, this disclosure may refer to a sending device and a receiving device to indicate the direction of data for a particular example. A sending device may transmit data according to a HARQ protocol. The HARQ protocol may be based on codeblock encoding that supports error detection and error correction by the receiving device. The receiving device may verify that the codeblock is properly decoded using error checking. When error checking fails, the receiving device may attempt error correction to recover and properly decode the codeblock. In a traditional HARQ protocol, the receiving device may send feedback indicating which codeblocks are successfully decoded and which codeblocks the receiving device has failed to decode. For each of those codeblocks that the receiving device has failed to decode, the sending device may transmit a HARQ retransmission that includes additional error correction data, the original codeblock, part of the original codeblock, or any combination thereof, in accordance with the HARQ protocol.

The probability that a codeblock is successfully decoded may depend on a modulation and coding scheme (MCS) utilized for a HARQ transmission. The MCS may define a coding rate, a bit puncturing rate, a modulation type, or any combination thereof. Typically, a lower MCS is associated with less throughput and higher probability of decoding. In contrast, a higher MCS may be associated with higher throughput and a lower probability of decoding. In some systems, an optimal MCS may be one which results in the highest effective data rate. The effective data rate of a wireless communication medium may be based on the throughput associated with successfully decoded transmissions. Failed decoding and retransmissions may lower the effective data rate. As HARQ protocols are improved to utilize techniques such as multiple incremental redundancy scheme (MIRS) or other improvements, the airtime associated with retransmissions may decrease such that a threshold quantity of decoding failures is acceptable to increase overall throughput. Furthermore, some wireless communication systems may continue to evolve such that a large number of codeblocks are included with each HARQ transmission. Traditional HARQ feedback techniques are based on identifying particular codeblocks for retransmission. A traditional HARQ feedback may include a bitmap to indicate success or failure for each codeblock. There may be advantages to improving traditional HARQ protocols to reduce overhead associated with feedback and HARQ retransmissions.

This disclosure provides systems, methods, and apparatus, including computer programs encoded on computer-readable media, for compressing feedback and improving a retransmission protocol. Various implementations relate generally to a HARQ protocol that utilizes a compressed feedback technique. The compressed feedback may cause a sending device to transmit a retransmission codeblock that can be used to decode a failed codeblock in a set of codeblocks without regard to the relative position of the failed codeblock in the set. Thus, a compressed feedback value may be associated with a decoding failure of a codeblock in a set of codeblocks without indicating in which position the failed codeblock is located in the set. The compressed feedback techniques in this disclosure may reduce the quantity of bits needed to provide feedback for a group of codeblocks (referred to as a feedback group).

In one aspect, the compressed feedback includes a feedback value that refers to a retransmission function that the sending device can use to prepare retransmission codeblocks for a HARQ retransmission. Thus, while the compressed feedback value can infer a pattern of one or more decoding failures in a feedback group, the compressed feedback value may not specify which specific codeblocks the receiving device has failed to decode. The retransmission codeblocks described herein may be constructed such that they can be used to decode failed codeblocks in more than one position in the feedback group. While the sending device may not be aware which codeblock the receiving device has failed to decode, the receiving device is aware of which codeblock it has failed to decode. The receiving device can process the retransmission codeblock using a receiver function that is based on the retransmission function and which codeblock the receiving device has previously failed to decode. The receiver function also may be referred to as a HARQ pre-processing operation (or HARQ operation for brevity). The receiver function is performed on the retransmission codeblock to recover the HARQ retransmission that is appropriate for the failed codeblock. The HARQ retransmission may include error correction bits, all or part of the failed codeblock, or any combination thereof.

In some implementations, the retransmission functions are based on a reversible combination (such as a reversible mathematical combination) of multiple codeblocks in a set of codeblocks. An example of a reversible combination may be a bitwise exclusive-or (XOR) operation. XOR operations are commonly used on cryptography and computing because of the symmetrical mathematical properties of the XOR operation. An XOR operation may be referred to as exclusive disjunction, bitwise addition modulo 2, EOR, or other terms. In the context of this disclosure, the XOR operation may be performed on two or more encoded codeblocks in a set of codeblocks to generate a single retransmission codeblock that bears a relationship to all codeblocks in the set of codeblocks. The retransmission codeblock may be referred to as a reversible combination because it can be reversed using a corresponding receiver function. For example, the receiving device can perform an XOR operation between the retransmission codeblock and the successfully decoded codeblocks in the set of codeblocks to obtain the failed codeblock. This disclosure includes several examples based on XOR operations and sign flip (which has the same effect as an XOR operation). The examples are provided for pedagogical purposes to describe a reversible combination of codeblocks and corresponding receiver operations. Other types of mathematical operations may be used within the scope of this disclosure. For example, any retransmission function that is reversible by a corresponding receiver function may be used to generate a retransmission codeblock, including those based on matrix mathematics, symmetrical transformations, or composition/decomposition algorithms, among other examples. In some implementations, a retransmission function and corresponding receiver function may be based on processing of modulation constellation points.

In some implementations, a compressed feedback message may include a plurality of feedback values. Each feedback value may be associated with a different feedback group. For example, a feedback group may include N codeblocks, where N is the feedback group size. In a traditional HARQ feedback, where each codeblock is represented by an acknowledgement (ACK) or negative-acknowledgement (NACK) bit, there would N bits used to indicate decoding status of the codeblocks in the feedback group. There are $2^N$ possible combinations of ACK/NACK bit patterns for the feedback group. However, as described herein, some retransmission functions may be used to generate retransmission codeblocks that can cover multiple ones of the $2^N$ possible combinations. By using a feedback value that indexes the retransmission functions, the quantity of bits needed to provide feedback can be reduced.

In some implementations, the feedback group size may be selected based on previous decoding results, channel conditions, a system configuration, a user configuration, or any combination thereof. The feedback group size may impact how many potential compressed feedback values are defined for that quantity of codeblocks. In some implementations, the efficiency gained by using compressed feedback may depend on the feedback group size and the codeblock error rate. For example, a smaller feedback group size may be desirable when the codeblock error rate is higher while a larger feedback group size may be desirable when the codeblock error rate is lower. In some implementations, the feedback group size may be selected dynamically. In some implementations, the feedback group size may be negotiated or configured by the first device and the second device.

Particular implementations of the subject matter described in this disclosure can be implemented to realize one or more of the following potential advantages. The compressed feedback may reduce airtime resources associated with HARQ feedback. As a result, more resources are available for HARQ transmissions and retransmissions. In a HARQ protocol that intentionally permits a threshold rate of decoding failures, the compressed feedback may improve the HARQ protocol. Thus, the HARQ protocol may support a larger quantity of codeblocks to be transmitted while reducing feedback overhead. While the compressed feedback may be considered lossy (in terms of granularity), the overall HARQ retransmission protocol may be considered lossless because the HARQ protocol is still capable of recovering the same quantity of failed codeblocks that would be recovered using a traditional uncompressed feedback a retransmission scheme. The compressed feedback techniques in this disclosure may be used without impacting performance of the wireless communication metrics (such as block error rate and throughput, among other examples) compared to traditional feedback techniques.

The retransmission protocols described herein may be applicable to a variety of communication systems, including wireless communication systems. Examples of a wireless communication system may include a wireless local area network (WLAN) or a wireless wide area network (WWAN). This disclosure refers to a sending device (also referred to as a first device) and a receiving device (also referred to as a second device), both of which could be any device in a WLAN or a WWAN. In a WLAN, the sending device may be an access point (AP) or a station (STA) and the receiving device may be the other one of the AP or the STA. In a WWAN, the sending device may be a BS or a UE and the receiving device may be the other one of the BS and the UE.

FIG. 1 is a block diagram conceptually illustrating an example of a wireless communication system 100. The wireless communication system 100 may include an LTE RAN or some other RAN, such as a 5G or NR RAN. The wireless communication system 100 may include a number of BSs 102 (shown as BS 102a, BS 102b, BS 102c, and BS 102d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BS subsystem serving this coverage area, or a combination thereof, depending on the context in which the term is used. A UE may communicate with a base station via the downlink (DL) and uplink (UL). The DL (or forward link) refers to the communication link from the BS to the UE, and the UL (or reverse link) refers to the communication link from the UE to the BS.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 102a may be a macro BS for a macro cell 108a, a BS 102b may be a pico BS for a pico cell 108b, and a BS 102c may be a femto BS for a femto cell 108c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless communication system 100 through various types of backhaul interfaces, such as a direct physical connection, a virtual network, or a combination thereof using any suitable transport network.

The wireless communication system 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 102d may communicate with macro BS 102a and a UE 104d in order to facilitate communication between BS 102a and UE 104d. A relay station also may be referred to as a relay BS, a relay base station, or a relay, among other examples.

The wireless communication system 100 may include a heterogeneous network that includes BSs of different types, for example, macro BSs, pico BSs, femto BSs, relay BSs, among other examples. These different types of BSs may have different transmit power levels, different coverage areas, and different impacts on interference in wireless communication system 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

UEs 104 (for example, 104a, 104b, 104c) may be dispersed throughout wireless communication system 100, and each UE may be stationary or mobile. A UE also may be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 104 may be included inside a housing that houses components of UE 104, such as processor components, memory components, similar components, or a combination thereof.

In general, any number of RANs may be deployed in a given geographic area. Each RAN may support a particular RAT and may operate on one or more frequencies. A RAT also may be referred to as a radio technology, an air interface, among other examples. A frequency also may be referred to as a carrier, a frequency channel, among other examples. Each frequency may support a single RAT in a given geographic area in order to avoid interference between RANs of different RATs. In some cases, NR or 5G RANs may be deployed.

In some examples, access to the air interface may be scheduled, where a scheduling entity (for example, a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a RAN with a scheduled access to time-frequency resources and having a cellular configuration, a P2P configuration, and a mesh configuration, a scheduling entity and one or more subordinate entities may communicate utilizing the scheduled resources.

In some aspects, two or more UEs 104 (for example, shown as UE 104a and UE 104e) may communicate directly using one or more sidelink channels (for example, without using a base station 102 as an intermediary to communicate with one another). For example, the UEs 104 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 104 may perform scheduling operations, resource selection operations, as well as other operations described elsewhere herein as being performed by the base station 102.

Figure 2:
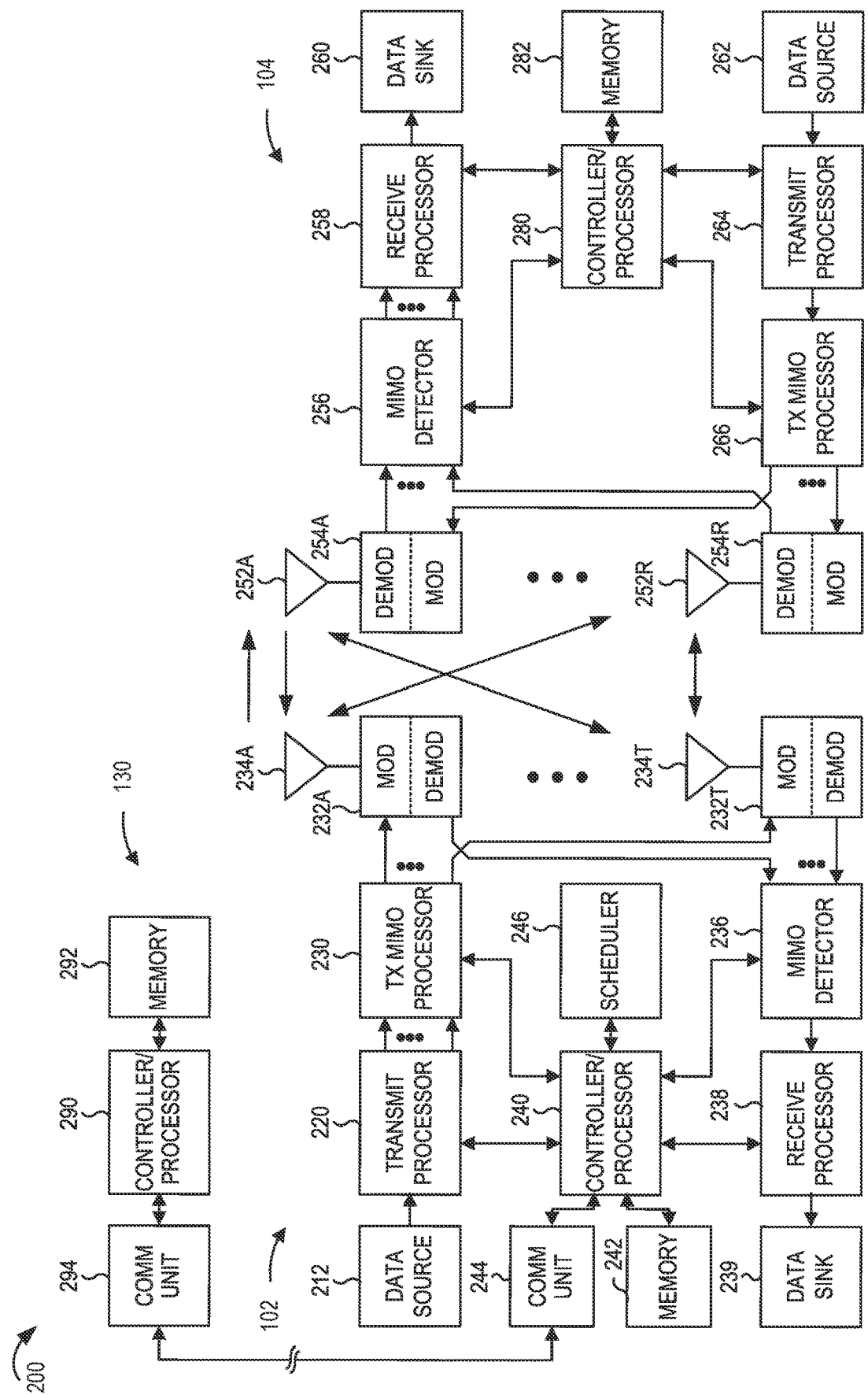
FIG. 2 shows a block diagram conceptually illustrating an example of a base station (BS) in communication with a user equipment (UE).

FIG. 2 is a block diagram conceptually illustrating an example 200 of a base station 102 in communication with a UE 104. In some aspects, the base station 102 and the UE 104 may respectively be one of the base stations and one of the UEs in wireless communication system 100 of FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI) or the like) and control information (for example, CQI requests, grants, upper layer signaling, among other examples) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 104, antennas 252a through 252r may receive the downlink signals from base station 102 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 104 to a data sink 260, and provide decoded control information and system information to a controller or processor (controller/processor) 280. A channel processor may determine RSRP, RSSI, RSRQ, channel quality indicator (CQI), among other examples. In some aspects, one or more components of UE 104 may be included in a housing.

On the uplink, at UE 104, a transmit processor 264 may receive and process data from a data source 262 and control information (for example, for reports including RSRP, RSSI, RSRQ, CQI, among other examples) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, among other examples), and transmitted to base station 102. At base station 102, the uplink signals from UE 104 and other UEs may be received by antennas 234, processed by demodulators 232, detected by a MIMO detector 236 if applicable, and further processed by a receive processor 238 to obtain decoded data and control information sent by UE 104. Receive processor 238 may provide the decoded data to a data sink 239 and the decoded control information to a controller or processor (i.e., controller/processor) 240. The base station 102 may include a communication unit 244 and may communicate to the network controller 130 via the communication unit 244. The network controller 130 may include a communication unit 294, a controller or processor (i.e., controller/processor) 290, and memory 292.

The controller/processor 240 of base station 102, the controller/processor 280 of UE 104, or any other component(s) of FIG. 2 may implement an RRC protocol between the base station 102 and the UE 104. In some implementations, the controller/processor 240 may output frequency information, measurement configuration, service mapping, frequency prioritization or other information for transmission to the UE 104. The controller/processor 280 may manage of the UE 104 in accordance with implementations described in more detail elsewhere herein. For example, the controller/processor 280 of UE 104, or any other component(s) (or combinations of components) of FIG. 2 may perform or direct operations of, for example, processes described herein. The memories 242 and 282 may store data and program codes for base station 102 and UE 104, respectively. The stored program codes, when executed by the controller/processor 280 or other processors and modules at UE 104, may cause the UE 104 to perform operations described herein. A scheduler 246 may schedule UEs for data transmission on the downlink, the uplink, or a combination thereof.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
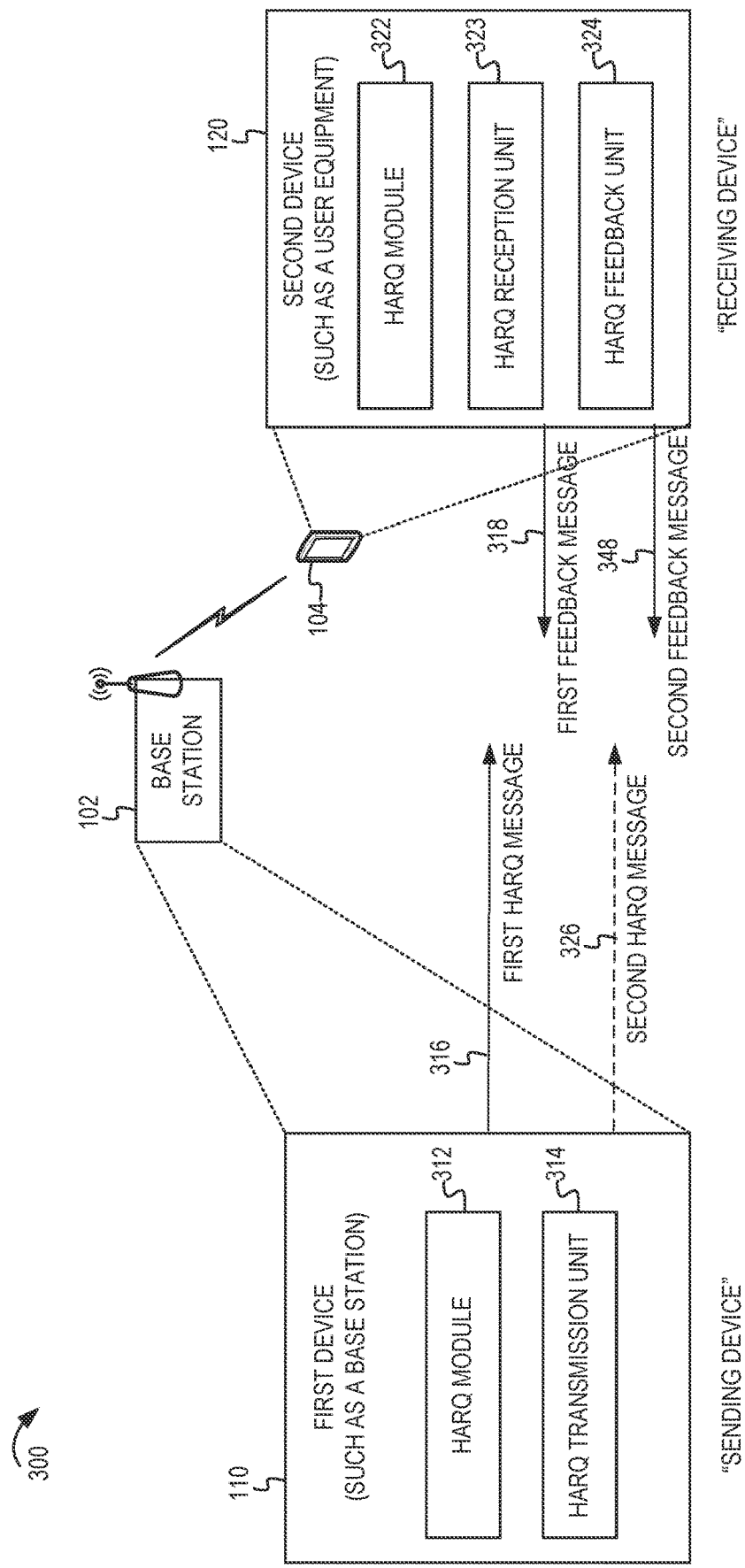
FIG. 3 depicts a system diagram of an example wireless communication system that implements a retransmission protocol, such as hybrid automatic repeat request (HARQ).

FIG. 3 depicts a system diagram of an example wireless communication system 300 that implements a retransmission protocol, such as hybrid automatic repeat request (HARQ). The wireless communication system 300 shown in FIG. 3 is based on the example wireless communication system 100 described with reference to FIG. 1. The BS 102 may be referred to as a first device 110 and the UE 104 may be referred to as a second device 120. Either the first device 110 or the second device 120 may behave as a sending device for a particular HARQ session and the other may behave as a receiving device in the HARQ session. A sending device also may be referred to as a HARQ transmitter (or H-TX) and the receiving device may be referred to as a HARQ receiver (or H-RX). The designations of sending device and receiving device may be reversed in other example HARQ sessions, such as when user data is being communicated from the second device 120 to the first device 110.

The first device 110 may send a first HARQ message 316 to the second device 120. The first HARQ message 316 may include initial transmissions of a first plurality of codeblocks. The second device 120 may respond with a first feedback message 318. In a traditional HARQ protocol, a traditional HARQ feedback message may identify particular codeblocks from the first HARQ message 316 that the second device 120 has failed to decode. As described herein, the first feedback message 318 may include compressed feedback to indicate which retransmission codeblocks are needed. The retransmission codeblocks may be based on sets of codeblocks such that a single retransmission codeblock may be used to recover any codeblock in that set using a HARQ operation (also referred to as a receiver function or a receiver operation) at the second device 120. The receiver function enables the second device 120 to reconstruct any codeblock in the set of codeblocks based on other successfully decoded codeblocks in that set.

Based on the first feedback message 318, the first device 110 may send a second HARQ message 326 that includes the retransmission codeblocks to assist the second device 120 in decoding the failed codeblocks. In some implementations, the second HARQ message 326 also may include initial transmissions of a second plurality of codeblocks. A HARQ protocol may support partial retransmission of data from a sending device to a receiving device. In Chase combining, the sending device may retransmit the original codeblock. In punctured Chase combining, the sending device may puncture some of the coded bits from the original codeblock to reduce the airtime needed for the HARQ retransmission. In some implementations, incremental redundancy may use some of the original codeblock and additional error correcting codes (such as additional parity bits). After processing the second HARQ message 326, the second device 120 may respond with a second feedback message 348.

The first device 110 (as sending device) may include a HARQ module 312 and a HARQ transmission unit 314. The HARQ module 312 may implement a HARQ protocol in accordance with aspects of this disclosure. The HARQ transmission unit 314 may prepare and communicate the HARQ messages 316 and 326. The second device 120 (as receiving device) may include a HARQ module 322, a HARQ reception unit 323 and a HARQ feedback unit 324. The HARQ module 322 may implement the HARQ protocol in accordance with aspects of this disclosure. The HARQ reception unit 323 may receive and process the HARQ messages 316 and 326. The HARQ reception unit 323 also may implement the various HARQ operations to decode failed codeblocks based on the retransmission codeblock. The HARQ feedback unit 324 may prepare and communicate the feedback messages 318 and 148.

Figure 4:
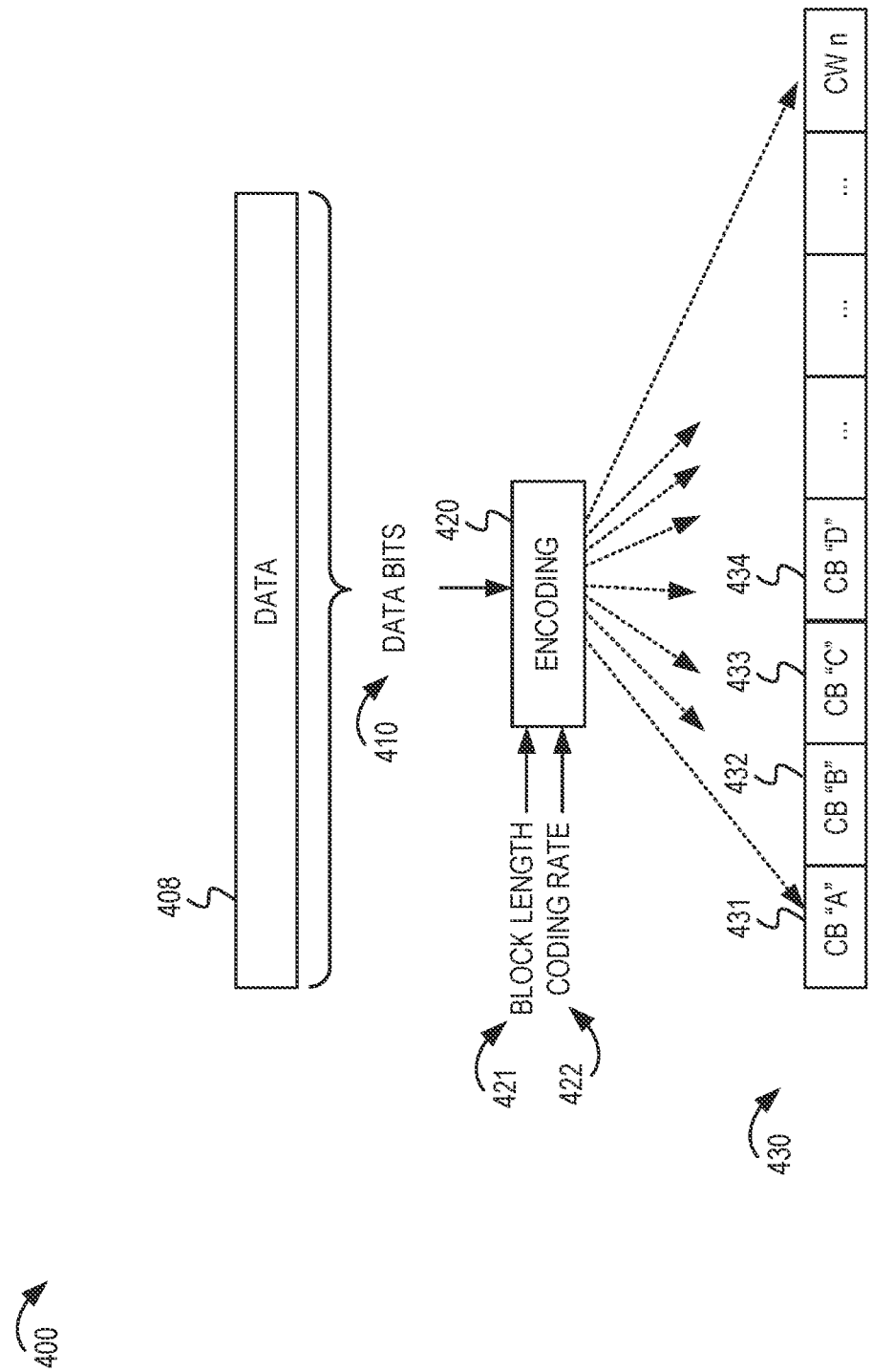
FIG. 4 depicts an example encoding process to prepare codeblocks.

FIG. 4 depicts an example encoding process 400 to prepare codeblocks. Source data 408 include data bits 410 that are distributed into blocks during the encoding process 400. A size of each block may be based on a block length 421 parameter. A coding rate 422 may affect how much of the block is punctured during the encoding process 420. For each block, the encoding process 420 may generate a codeblock. Thus, the source data is converted to a plurality of codeblocks 430. For example, the plurality of codeblocks 430 may include codeblocks 431, 432, 433, and 434, among others. For reference, the codeblocks 431, 432, 433, and 434 may be referred to as CB "A", CB "B", CB "C", and CB "D", respectively.

In some implementations, the encoding process 400 may support forward error correction (FEC) encoding. One example encoding process that supports FEC encoding may be based on low density parity check (LDPC) encoding. There may be many other alternative implementations of FEC encoding. FEC encoding is generally well known in the art. The LDPC encoding may be systematic, such that it encodes a block of data bits into a codeblock of a particular code block size by adding parity bits. The parity bits are calculated using LDPC parity-check matrices. In some implementations, a sending device may store the original data blocks or the original codeblock before puncturing. For example, when a HARQ retransmission is needed, the HARQ retransmission may be based on the original codeblock. Alternatively, the retransmission may be based on the original block of data bits encoded using a different coding rate, a different puncturing rate, or different punctured bits that were removed from the first set of parity bits.

Figure 5:
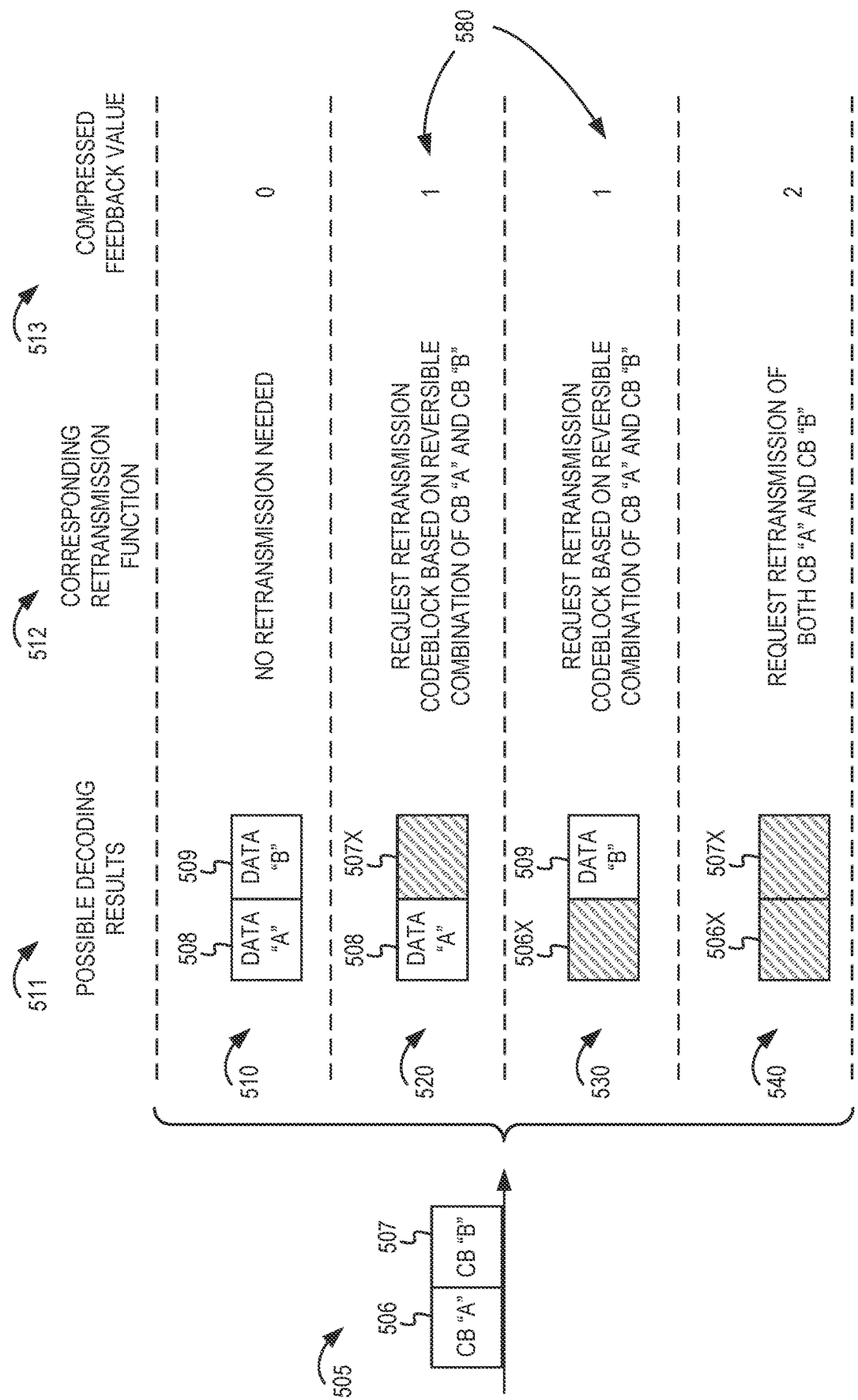
FIG. 5 depicts example results and compressed feedback values based on a receiving device may processing the initial HARQ transmissions of two codeblocks.

FIG. 5 depicts example results and compressed feedback values based on a receiving device may processing the initial HARQ transmissions of two codeblocks. For the purposes of this illustrative example, only two codeblocks 506 and 507 (also referred to as CB "A" 506 and CB "B" 507) are described. A sending device may transmit (not shown) the codeblocks in a HARQ message 505 that includes the initial HARQ transmissions of the codeblocks. The receiving device receives the HARQ message 505 and attempts to decode the CB "A" 506 and the CB "B" 507. A decoding attempt may include computation of logarithm likelihood ratios (LLRs) for different bit position of the codeblock. The LLRs are used to generate decoded data bits. The decoding attempt also may include computation of an error checking value that can be compared with error checking information embedded in the codeblock. A codeblock is successfully decoded when the receiving device can verify that the computed error checking value matches the error checking information embedded in the codeblock. In some implementations, the receiving device may attempt to use error correction to correct bit errors and compute another error checking value. After a threshold number of decoding attempts, if the receiving device cannot verify the error checking value, the receiving device may determine that it has failed to decode the codeblock. A success or failure to decode a codeblock may be referred to as a decoding result.

FIG. 5 shows the possible decoding results 511 that may be associated with decoding two code blocks. FIG. 5 also shows the corresponding retransmission functions 512 and compressed feedback values 513 mat may be associated with each decoding result 511. There are four possible combinations representing the collective decoding results associated with decoding two codeblocks. The four possible combinations are described as a first scenario 510, a second scenario 520, a third scenario 530, and a fourth scenario 540.

In the first scenario 510, the receiving device successfully decodes both of the CB "A" 506 and the CB "B" 507 and obtains data "A" 508 and data "B" 509, respectively. Because both codeblocks were successfully decoded, no retransmission is needed. A first compressed feedback value (shown as "0" for example purposes) may indicate that no retransmission function is needed for the first scenario 510.

In the second scenario 520, the receiving device may successfully decode the CB "A" 506 but fails to decode the CB "B" 507. Thus, the receiving device obtains data "A" 508. Although the receiving device failed to decode the CB "B" 507, the receiving device may store the LLRs (shown as CB "B" LLRs 507X) that were generated during the decoding attempt. The CB "B" LLRs 507X may be used in an incremental redundancy scheme or Chase combining technique to combine a HARQ retransmission associated with CB "B" 507 with the original CB "B" LLRs 507X. The receiving device also may store the CB "A" LLRs (not shown) of the successfully decoded CB "A" 506. As further described herein, the corresponding retransmission function for the second scenario 520 may be based on reversible combination that supports HARQ retransmission of both the CB "A" 506 and the CB "B" 507. A second compressed feedback value (shown as "1" for example purposes) may indicate a request for the sending device to send a retransmission codeblock that is based on the reversible combination of both the CB "A" 506 and the CB "B" 507.

In the third scenario 530, the receiving device may fail to decode the CB "A" 506 but successfully decodes the CB "B" 507. Thus, the receiving device obtains data "B" 509. Although the receiving device failed to decode the CB "A" 506, the receiving device may store the LLRs (shown as CB "A" LLRs 506X) that were generated during the decoding attempt. The receiving device also may store the CB "B" LLRs (not shown) of the successfully decoded CB "B" 507. The corresponding retransmission function for the third scenario 530 may be based on the same reversible combination as described in the second scenario 520 because the reversible combination supports HARQ retransmission of both the CB "A" 506 and the CB "B" 507. Thus, the third scenario 530 can use the same second compressed feedback value ("1") that was described with reference to the second scenario 520. Since both the second scenario 520 and the third scenario 530 can be corrected using the same type of retransmission codeblock, they can be associated with the same compressed feedback value (as pointed out by reference 580). The retransmission functions and corresponding receiver functions are described by way of examples with reference to FIGS. 6A, 6B, 7A and 7B to illustrate how the same retransmission function can be used regardless of whether the decoding results follow the second scenario 520 or the third scenario 530.

In the fourth scenario 540, the receiving device fails to decode both of the CB "A" 506 and the CB "B" 507. The receiving device may store the LLRs (CB "A" LLRs 506X and CB "B" LLRs 507X) for use with a retransmission. Because both codeblocks failed to be decoded, the receiving device may request retransmission of both CB "A" 506 and CB "B" 507. A third compressed feedback value (shown as "2" for example purposes) may indicate that a request for retransmission of both codeblocks.

Figure 6A:
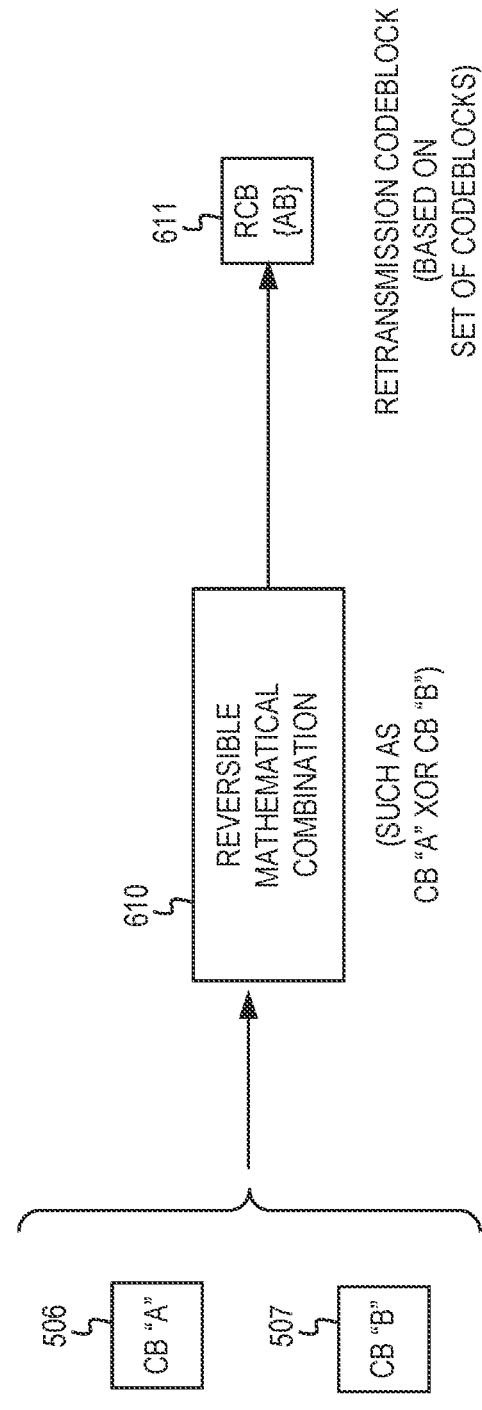
FIG. 6A depicts an example retransmission function associated with two of the decoding results described with reference to FIG. 5.

FIG. 6A depicts an example retransmission function 600 associated with two of the decoding results described with reference to FIG. 5. The retransmission function is performed when the second feedback value ("1") is received from the receiving device. As a reminder, the second feedback value is used with the second scenario 520 and the third scenario 530 of FIG. 5 (meaning that one of the codeblocks were successfully decoded by the other codeblock was not successfully decoded). For brevity, the sending device retransmission operations associated with the first scenario 510 and the fourth scenario 540 of FIG. 5 are omitted from this description because they may not use a retransmission function to generate a reversible combination. The retransmission function 600 is used when one of the two codeblocks failed to decode but the other one was successfully decoded. The two codeblocks may be referred to as a set of codeblocks. In this retransmission function 600, the set of codeblocks includes the CB "A" 506 and the CB "B" 507. The retransmission function 600 includes performing a reversible combination 610 of the CB "A" 506 and the CB "B" 507. For example, the reversible combination 610 may include performing a bitwise XOR of the two codeblocks 506 and 507. The result of the reversible combination 610 may be referred to as a retransmission codeblock 611. In FIG. 6A, the retransmission codeblock 611 is denoted as "RCB{AB}" to indicate that it is a retransmission codeblock calculated using the reversible combination 610 on a set of codeblocks that includes CB "A" 506 and CB "B" 507. The sending device can generate the retransmission codeblock 611 and transmit the retransmission codeblock 611 in the subsequent HARQ message (not shown) to the receiving device. For example, the retransmission codeblock 611 may be modulated and transmitted by a transmitter unit (not shown) of the sending device.

It is noted that the sending device may not be aware which codeblock in the set of codeblocks (CB "A" and CB "B") has failed to decode. The same retransmission codeblock 611 may be used by the receiving device to recover either of the codeblocks in the set of codeblocks.

Figure 6B:
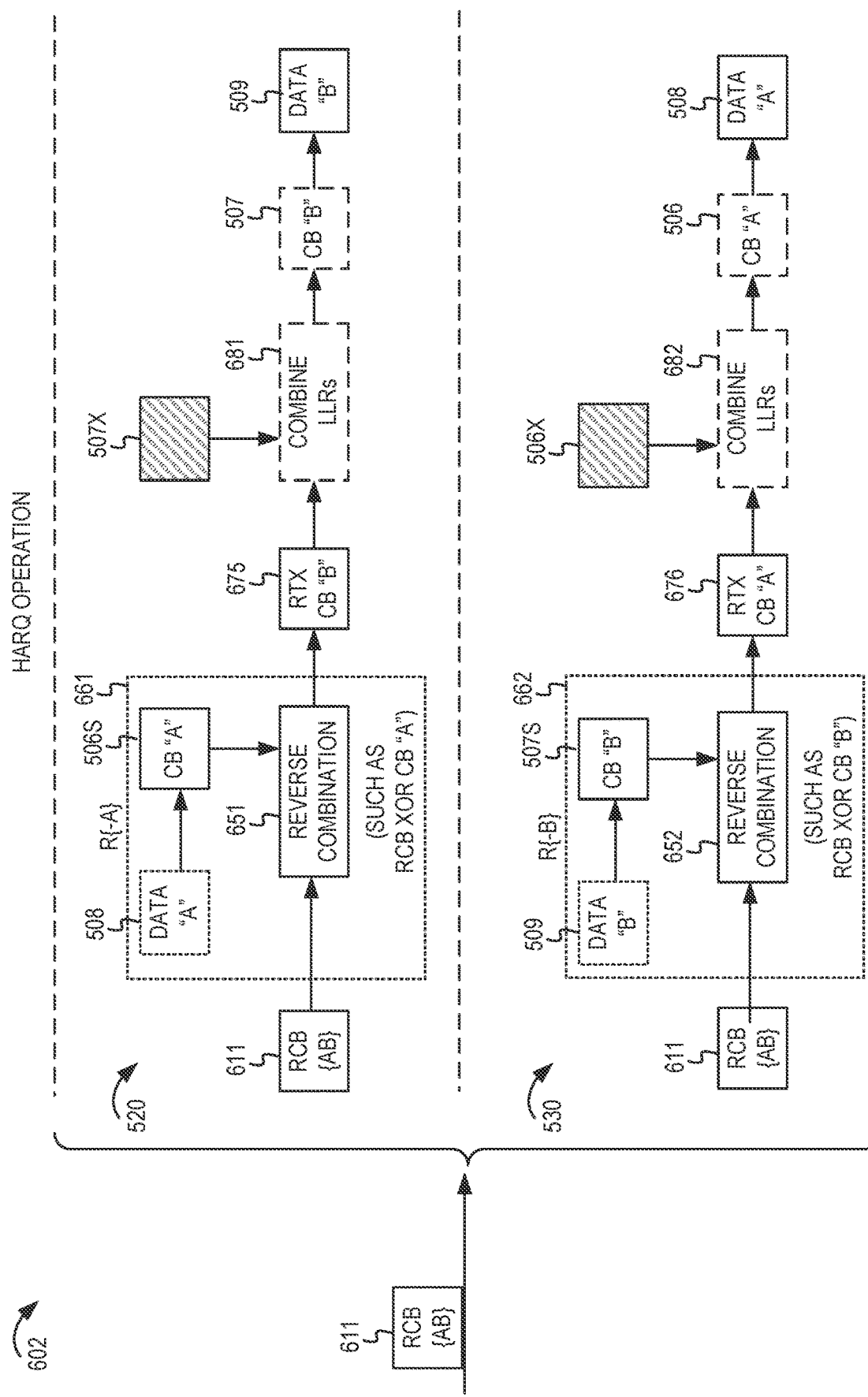
FIG. 6B depicts example receiver functions that may be used with the retransmission codeblock described with reference to FIG. 6B.

FIG. 6B depicts example receiver functions 602 that may be used with the retransmission codeblock 611 described with reference to FIG. 6A. The receiver functions also may be referred to as receiver operations or HARQ operations. Although the sending device was unaware of which codeblock in the set of codeblocks (CB "A" and CB "B") has failed to decode in the previous decoding attempt, the receiving device is aware of the results of the previous decoding attempt. If the previous decoding attempt was the second scenario 520 (meaning the CB "B" 507 failed to decode), the receiving device may use the retransmission codeblock 611 with a HARQ operation to decode the failed CB "B" 507. For example, the receiving device may perform a first receiver function 661 to reverse the reversible combination of the set of codeblocks. If the previous decoding attempt was the third scenario 530 (meaning the CB "A" 506 failed to decode), the receiving device may use the retransmission codeblock 611 with a different HARQ operation to decode the failed CB "A" 506. For example, the receiving device may perform a second receiver function 662 to reverse the reversible combination of the set of codeblocks. The receiver functions 661 and 662 are described herein based on their corresponding scenario 520 and 530 associated with the previous decoding results.

The HARQ operation for the second scenario 520 includes a receiver function 661 to extract retransmission data for CB "B" (referred to as RTX CB "B" 675). The receiver function 661 may include operations to remove the decoded CB "A" 506 from the retransmission codeblock 611. Merely as a form of shorthand notation, the receiver function 661 may be referred to as a removal of CB A (R{-A}) from the set of codeblocks {AB} that were used to generate the retransmission codeblock 611. In some implementations, the receiver function 661 may be a sign flip performed on the retransmission codeblock 611 based on the CB "A" 506. The sign flip operates similar to an XOR function—however a sign flip may be performed on soft values (such as LLRs) obtained from a receiver chain prior to decoding. The receiver function 661 also may be referred to as an LLR sign flip. For example, the receiving device may generate LLRs of the retransmission codeblock 611 and use the CB "A" LLRs 506S for bitwise sign flip operations on the LLRs of the retransmission codeblock 611. The CB "A" LLRs 506S may be stored during the previous decoding attempt or may be regenerated based on the data "A" 508 that was previously decoded. As a result of the receiver function 661, the receiving device obtains the RTX CB "B" 675. It should be noted that the RTX CB "B" 675 may not be a full retransmission of the original CB "B" 507. Rather, the RTX CB "B" 675 may include parity bits or punctured code bits that can be used with an incremental redundancy scheme. The receiving device may combine (shown at block 681) the LLRs of the RTX CB "B" 675 with the CB "B" LLRs 507X stored as part of the previous decoding attempting of the earlier HARQ transmission. The combined LLRs may form the CB "B" 507 which can be successfully decoded to obtain data "B" 509.

The HARQ operation for the third scenario 530 is similar to the one described for the second scenario 520 except that the receiver function 662 is used to extract retransmission data for CB "A" (referred to as RTX CB "A" 676). Merely as a form of shorthand notation, the receiver function 662 may be referred to as a removal of CB B (R{-B}) from the retransmission codeblock 611. The receiver function 662 may include an LLR sign flip of the LLRs of the retransmission codeblock 611 using the CB "B" LLRs 507S. The CB "B" LLRs 507S may be stored during the previous decoding attempt or may be regenerated based on the data "B" 509. As a result of the receiver function 662, the receiving device obtains the RTX CB "A" 676) which can be used with the CB "A" LLRs 506X stored as part of the previous decoding attempting of the earlier HARQ transmission. The combined LLRs may form the CB "A" 506 which can be successfully decoded to obtain data "A" 508.

Figure 7A:
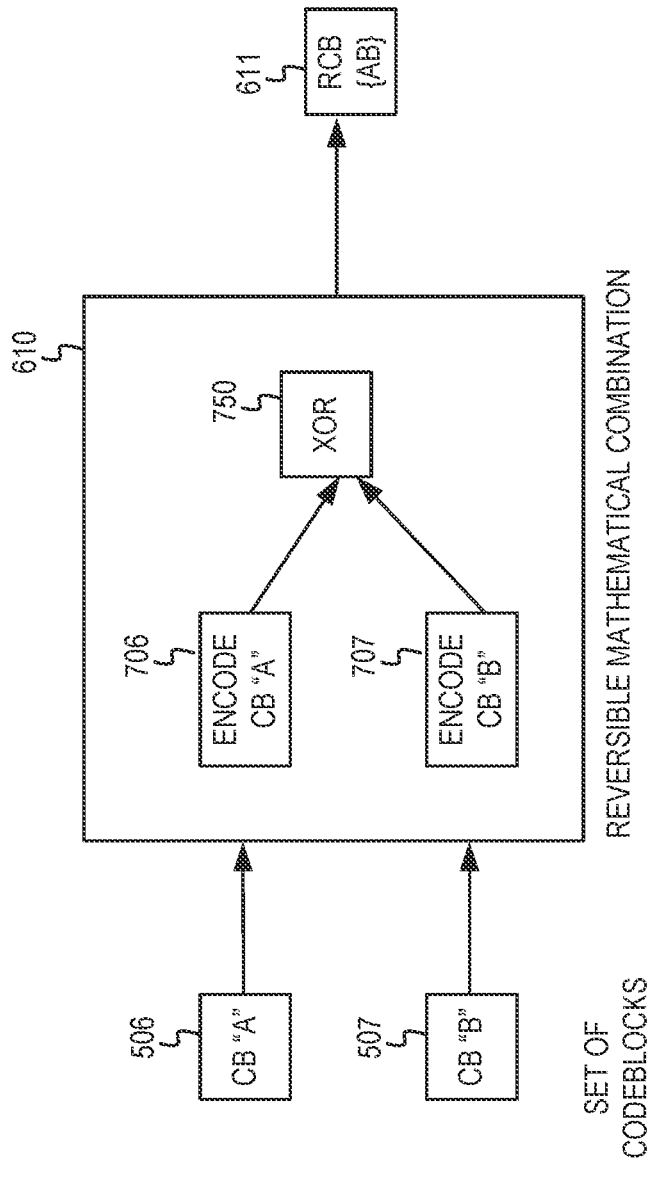
FIG. 7A depicts another example retransmission function associated with two of the decoding results described with reference to FIG. 5.

FIG. 7A depicts another example retransmission function associated with two of the decoding results described with reference to FIG. 5. The example described with reference to FIG. 7A is similar to FIG. 6A. In this retransmission function 700, the set of codeblocks includes the CB "A" 506 and the CB "B" 507. The retransmission function 600 includes performing a reversible combination 610 of the CB "A" 506 and the CB "B" 507. The reversible combination 610 may include encoding CB "A" 506 (encoding shown at block 706) and encoding CB "B" 507 (encoding shown at block 707). The encoded CB "A" and encoded CB "B" may be combined using a bitwise XOR of the two encoded codeblocks to produce the retransmission codeblock 611 ("RCB{AB}"). The retransmission codeblock 611 may be modulated and transmitted by a transmitter unit (not shown) of the sending device.

Figure 7B:
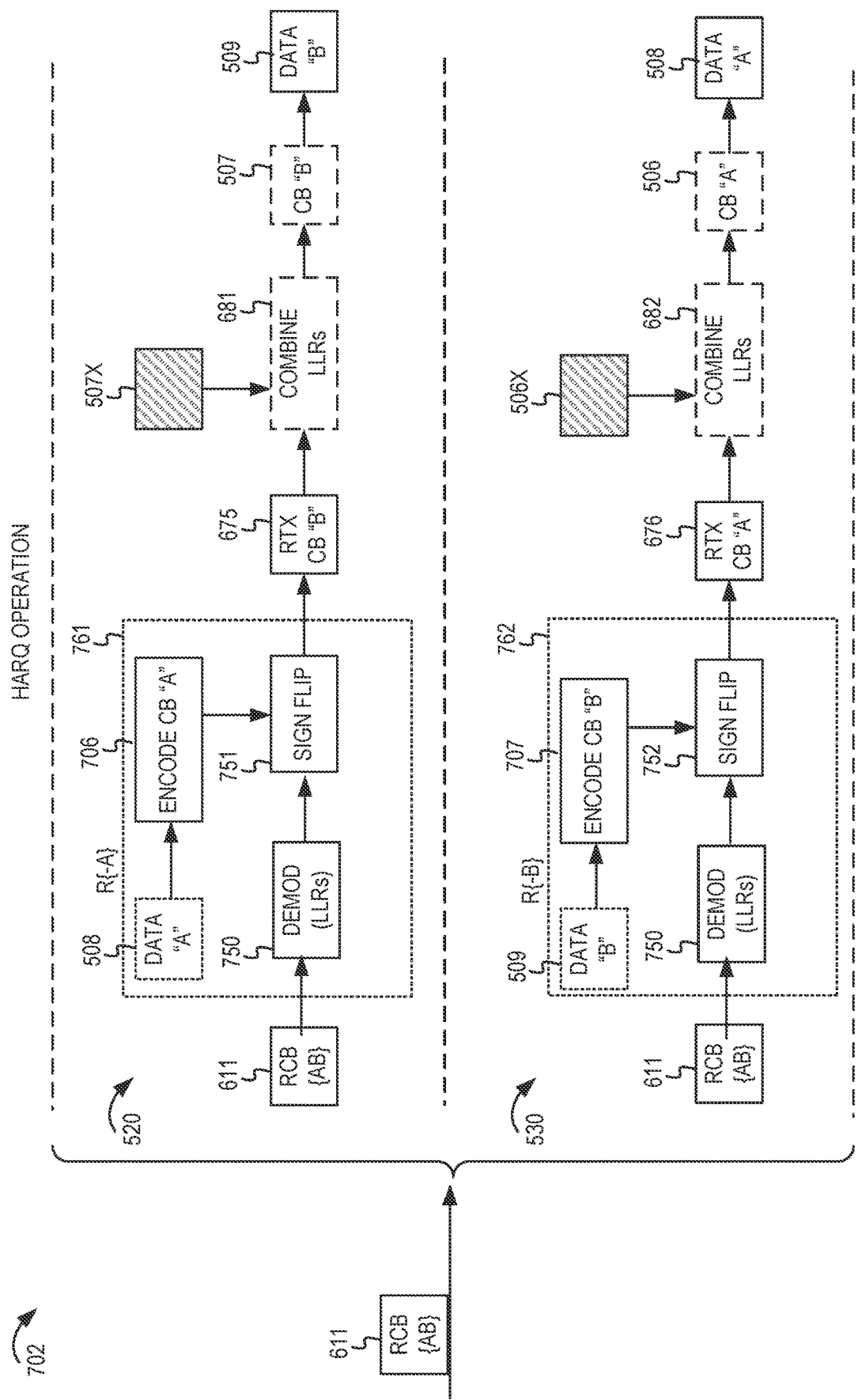
FIG. 7B depicts example receiver functions that may be used with the retransmission codeblock described with reference to FIG. 7A.

FIG. 7B depicts example receiver functions that may be used with the retransmission codeblock described with reference to FIG. 7A. The example described with reference to FIG. 7B is similar to FIG. 6B. The receiving device may use the retransmission codeblock 611 with a HARQ operation to obtain a failed CB in the set of codeblocks. The receiving device may perform a first receiver function 761 or a second receiver function 762 to reverse the reversible combination of the set of codeblocks depending on which codeblock failed in the previous decoding results. The receiver functions 661 and 662 are described herein based on their corresponding scenario 520 and 530 associated with the previous decoding results.

The first receiver function 761 may be used to obtain a retransmission codeblock "B" 675 from the retransmission codeblock 611. The first receiver function 761 may include operations to remove the encoded CB "A" 706 from the retransmission codeblock 611. The receiver function 761 may include demodulating (shown at block 750) the retransmission codeblock 611. Demodulating 750 may include generating LLRs at a receiver unit (not shown) of the receiving device. The first receiver function 761 also may include encoding CB "A" 706. The first receiver function 761 may include performing a sign flip 751 on the demodulated LLRs based on the encoded CB "A". The sign flip operates similar to an XOR function—however a sign flip may be performed on LLRs. Thus, the sign flip can be performed after demodulating the retransmission codeblock 611 and before decoding the resultant RTX CB "B" 675. The rest of the first HARQ operation in FIG. 7B is the same as described with reference to FIG. 6B.

The second receiver function 762 may be used to obtain a retransmission codeblock "A" 676 from the retransmission codeblock 611. The second receiver function 762 may include operations to remove the encoded CB "B" 707 from the retransmission codeblock 611. The second receiver function 762 may include demodulating (shown at block 750) the retransmission codeblock 611. Demodulating 750 may include generating LLRs at a receiver unit (not shown) of the receiving device. The second receiver function 762 also may include encoding CB "B" 707. The second receiver function 762 may include performing a sign flip 752 on the demodulated LLRs based on the encoded CB "B". The sign flip can be performed after demodulating the retransmission codeblock 611 and before decoding the resultant RTX CB "A" 676. The rest of the second HARQ operation in FIG. 7B is the same as described with reference to FIG. 6B.

The examples described with reference to FIGS. 6A, 6B, 7A, and 7B are only examples of retransmission functions and receiver functions that can be used with compressed feedback. Other types of retransmission functions and corresponding receiver functions may be possible. For example, some examples may be based on summation of constellation points in a modulation scheme. The summation of constellation points may be a reversible combination. In a sending device, a CB "A" may be associated with one or more constellation points $x_A$. A CB "B" may be associated with one or more constellation points $x_B$. When transmitting a retransmission codeblock (RTX{AB}) as a combination of CB "A" and CB "B", a transmit unit of the sending device may combine the constellation points $x_A$ and $x_B$ using a reversible combination. For example, the transmit unit may determine transmission constellation points according to formula (1):

$$\text{mod}(x_A+x_B, M) \tag{1}$$

where M is a value configured to constrain the amount of energy associated with the summation of the constellation points $x_A+x_B$. The value of M may be predetermined, specified in a technical standard, or determined based on empirical analysis. In some implementations, the value M may be based on the constellation size. For example, the value M may be equal to the dimensional value (such as x and y of a constellation point) of the outmost constellation point+1/2d where d is distance between the points in the constellation. The mod operation is related to a mathematical modulo but is performed on modulation points. In some implementations, the mod operation may be shifted (as shown in formula (2)) to keep the transmission constellation point in a region around zero (between −M/2 and +M/2). Thus, a mod operation may be a shifted modulo calculation.

$$\text{mod}(x, M) = \text{modulo}\left(x + \frac{M}{2}, M\right) - M/2 \tag{2}$$

where modulo(x, M) is x modulo M.

A receiving device that has knowledge of either $x_A$ or $x_B$ can recover the other one of $x_A$ and $x_B$. For example, the receiving device can calculate mod(y−$x_B$) to obtain $x_A$, where y is the received constellation point. Alternatively, the receiving device can calculate mod(y−$x_A$) to obtain $x_B$.

Figure 8:
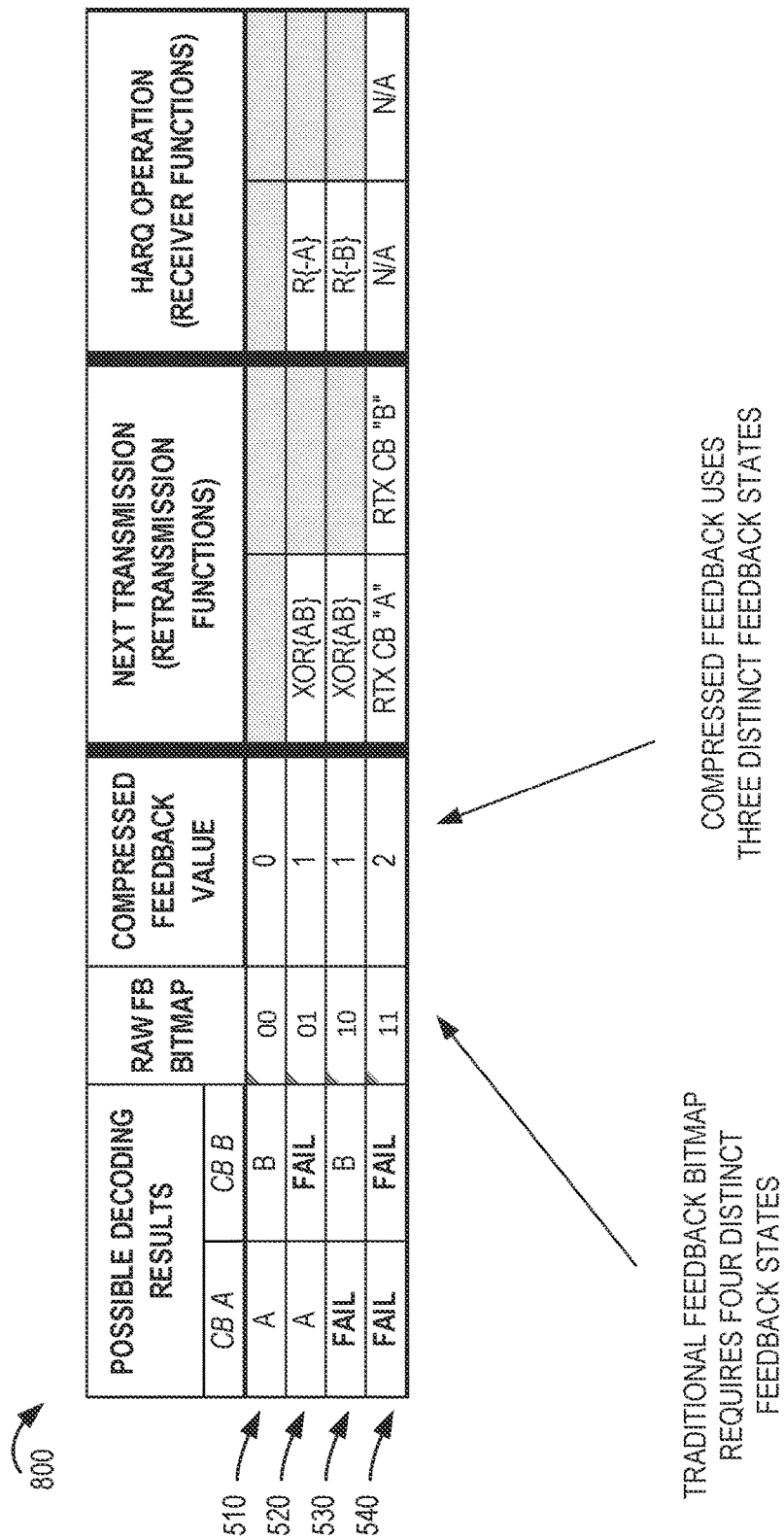
FIG. 8 depicts a table that consolidates the example scenarios described with reference to FIGS. 5-7 in which a compressed feedback is used with a feedback group size of two codeblocks.

FIG. 8 depicts a table 800 that consolidates the example scenarios described with reference to FIGS. 5-7B in which a compressed feedback is used with a feedback group size of two codeblocks. As described with reference to FIG. 5, there are four possible decoding results that can occur with two codeblocks. In a traditional feedback bitmap, there would be two (2) bits of data in a feedback bitmap, each bit representing the result for a different codeblock. The quantity of information bits in a feedback bitmap can be represented as base-2 log 4. Using aspects of this disclosure, a compressed feedback may have three distinct states to represent the possible feedback values. The quantity of information bits in a compressed feedback can be represented as base-2 log 3 (which is approximately 1.585 information bits). In some implementations, the compressed feedback may use fewer waveforms to communicate the feedback. In a conversion from information bits to constellation points, typically 2 information bits would be communicated using one of 4 possible waveforms. The receiving device will measure the distance of the received signal to each of the 4 possible waveforms, and select the waveform with the minimal distance to determine the 2 bits. Being able to distinguish between 4 possible waveforms requires that the noise is small enough—for example lower than the noise predicted by Shannon bound. Using compressed feedback described herein, it may be possible to use fewer possible waveforms (each representing a different compressed feedback value). For example, 3 possible waveforms may be allocated to compressed feedback values 0, 1, or 2, respectively. It is easier to distinguish between 3 waveforms and the noise can be larger (by 10*log 10(4/3) dB=1.2 dB). Therefore, the compressed feedback may be sent using a shorter waveform—and consume less frequency and time resources.

The examples in FIGS. 5-8 are described using a feedback group size of two for pedagogical purposes to illustrate potential gains associated with compressed feedback. However, the techniques and potential gains are also applicable with feedback groups of a larger size.

The grey shaded cells in Table 800 represent opportunities to transmit new codeblocks (not shown) with the retransmission codeblocks in the next HARQ message. For example, when the compressed feedback value of "1" results in a single retransmission codeblock, the next HARQ message may include that retransmission codeblock along with a new codeblock in the next HARQ message following the compressed feedback.

FIG. 9 depicts a table 900 in which a compressed feedback is used with a feedback group size of four codeblocks. There are 16 possible scenarios associated with decoding results of four codeblocks. A raw bitmap may include 16 values (enumerated from "0000" to "1111"). In a traditional feedback bitmap, there would be four (4) bits of data in a feedback bitmap, each bit representing the result for a different codeblock. The quantity of information bits in a feedback bitmap can be represented as base-2 log 16 (which is 4 information bits). However, just as described with the illustrative examples in FIGS. 5-8, a compressed feedback value may be associated with different retransmission functions. The retransmission functions may be the same for some of the 16 possible decoding results. Thus, fewer compressed feedback values are needed. Table 900 shows that seven (7) compressed feedback values (enumerated "0" to "6") could be used as a compressed feedback value for the feedback group. The quantity of information bits in a compressed feedback for a feedback group size of four codeblocks can be represented as base-2 log 7 (which is approximately 2.8 information bits). Thus, the compressed feedback technique can result in a roughly 30% improvement over the traditional feedback bitmap.

For brevity, the description of each scenario is omitted. However, the retransmission functions and corresponding receiver functions for each scenario can be observed from the table 900. The grey shaded cells in Table 900 represent opportunities to transmit new codeblocks (not shown) with the retransmission codeblocks in the next HARQ message.

By way of example, refer to the second line of table 900 in which only CB "B" (out of CB "A", CB "B", CB "C", and CB "D" in the feedback group) failed to decode. In this example, a first retransmission function may be based on a set of codeblocks that includes CB "A", CB "B", CB "C", and CB "D." The first retransmission function is represented as an XOR operation using the set of codeblocks {ABCD} to generate a retransmission codeblock. Upon receiving the retransmission codeblock, the receiving device may perform a receiver function (R{−ACD}) using the LLRs for successfully decoded CB "A", CB "C" and CB "D." The R{-ACD} can be performed as a plurality of sign flip operations (represented as R{-A}, R{−C}, and R{-D}) in any order. As a result of the receiver function, the receiving device can reconstruct the RTX CB "B."

As another example, refer to the sixth line of table 900 in which CB "B" and CB "D" failed to decode. The receiving device may send a compressed feedback value ("3") associated with two retransmission functions. A first retransmission function uses a first set of codeblocks that includes CB "A" and CB "B." The first retransmission function generates a first retransmission codeblock. A second retransmission function uses a second set of codeblocks that includes CB "C" and CB "D." The second retransmission function generates a second retransmission codeblock. The receiving device may use the first retransmission codeblock with a first receiver function (R{−B}) to obtain the RTX CB "A." The receiving device may use the second retransmission codeblock with a second receiver function (R{-D}) to obtain the RTX CB "C."

In some implementations, the compressed feedback values, corresponding retransmission functions and corresponding receiver functions may be stored in a memory of the receiving device and the sending device. The memory may include a lookup table or database. The compressed feedback values, corresponding retransmission functions and corresponding receiver functions may be predetermined or may be algorithmically determined. In some implementations, the compressed feedback values, corresponding retransmission functions and corresponding receiver functions may be specified in a standard specification implemented by both the receiving device and sending device.

Figure 10:
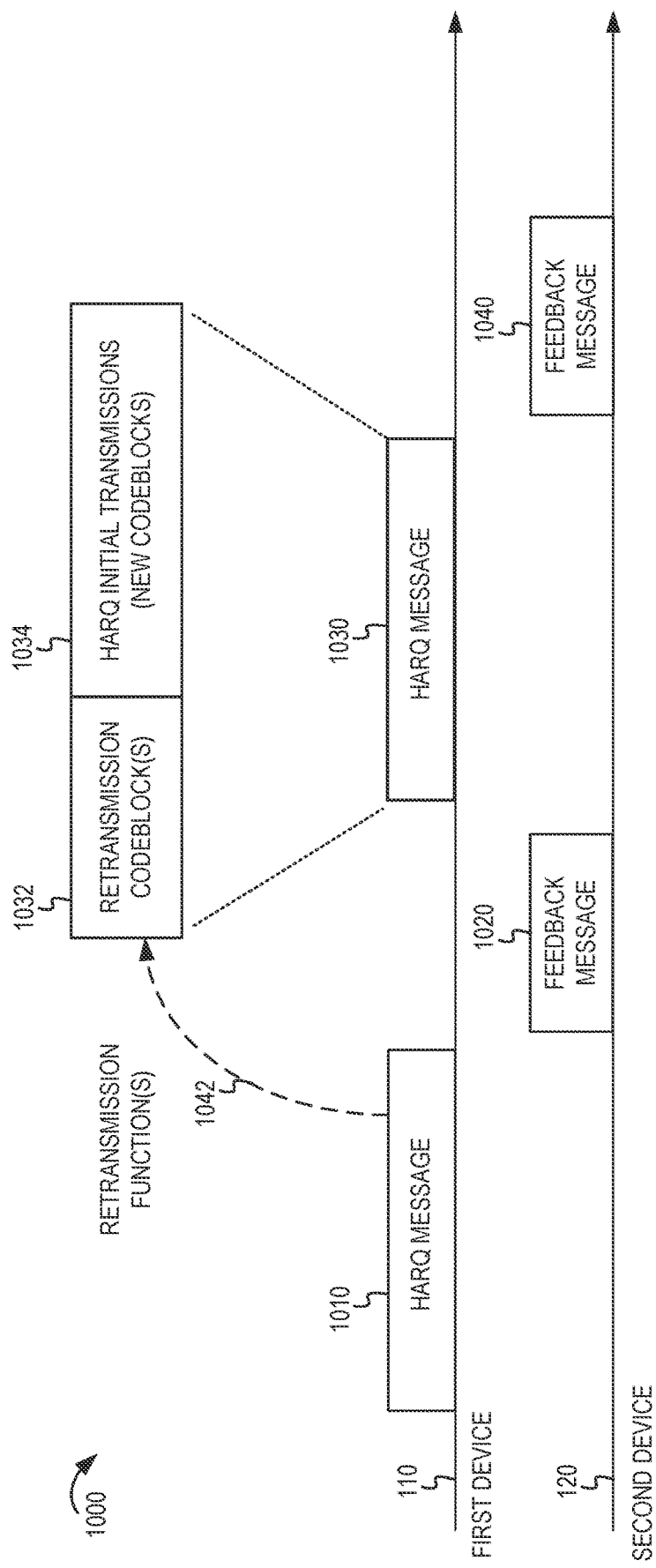
FIG. 10 depicts example HARQ session with multiple HARQ messages.

FIG. 10 depicts example HARQ session 1000 with multiple HARQ messages. In FIG. 10, a first HARQ message 1010 may be sent from the first device 110 to the second device 120. The first HARQ message 1010 may include a first plurality of codeblocks. The second device 120 may respond with a first feedback message 1020 that includes one or more compressed feedback values. The first feedback message 1020 includes a compressed value for each feedback group. The quantity of compressed feedback values will depend on the feedback group size and the quantity of codeblocks included in the first HARQ message 1010. In a second HARQ message 1030, the first device 110 may include one or more retransmission codeblock(s) based on retransmission function(s) 1042, as well as initial transmissions 1034 of a second plurality of codeblocks (referred to as new codeblocks). The ordering of retransmission codeblocks and new codeblocks may be based on the feedback group size. For example, new codeblocks may fill available slots (shown in grey in Tables 800 and 900) for a sequential ordering of HARQ groups having the same size as the feedback group size.

The second device 120 may send a second feedback message 1040 in response to the second HARQ message 1030. The HARQ session may continue with alternating HARQ messages and feedback messages while there is still data to send from the first device 110 to the second device 120 or until a transmission opportunity ends.

In some implementations, the feedback group size may change over the course of successive HARQ messages. For example, the first feedback message 1020 may include compressed feedback values using a feedback group size of 4 codeblocks per group in the first HARQ message 1010. Consider an example scenario in which 3 of the codeblocks in a group of 4 codeblocks in the first HARQ message 1010 failed to successfully decode. The first feedback message 1020 may include a compressed feedback value for the group of 4 codeblocks. After processing the second HARQ message 1030, the second device 120 may include a compressed feedback value to report based on collective decoding results of the 3 failed CBs. Thus, in this example, the feedback group size may be 3 codeblocks per group when preparing the compressed feedback for the second feedback message 1040.

In some implementations, the feedback group size may be dynamically determined or negotiated by the first device 110 and the second device 120. For example, the first device 110 and the second device 120 may determine or negotiate the feedback group size based on the number of codeblocks per OFDM symbol, channel conditions, codeblock error rate, or any combination thereof. In some implementations, the feedback group size may be signaled as a parameter in a configuration or control message (not shown) as part of the HARQ protocol. In some implementations, each feedback message (such as feedback messages 1020 and 1040) may include a parameter indicating the feedback group size on a per-message basis.

Figure 11:
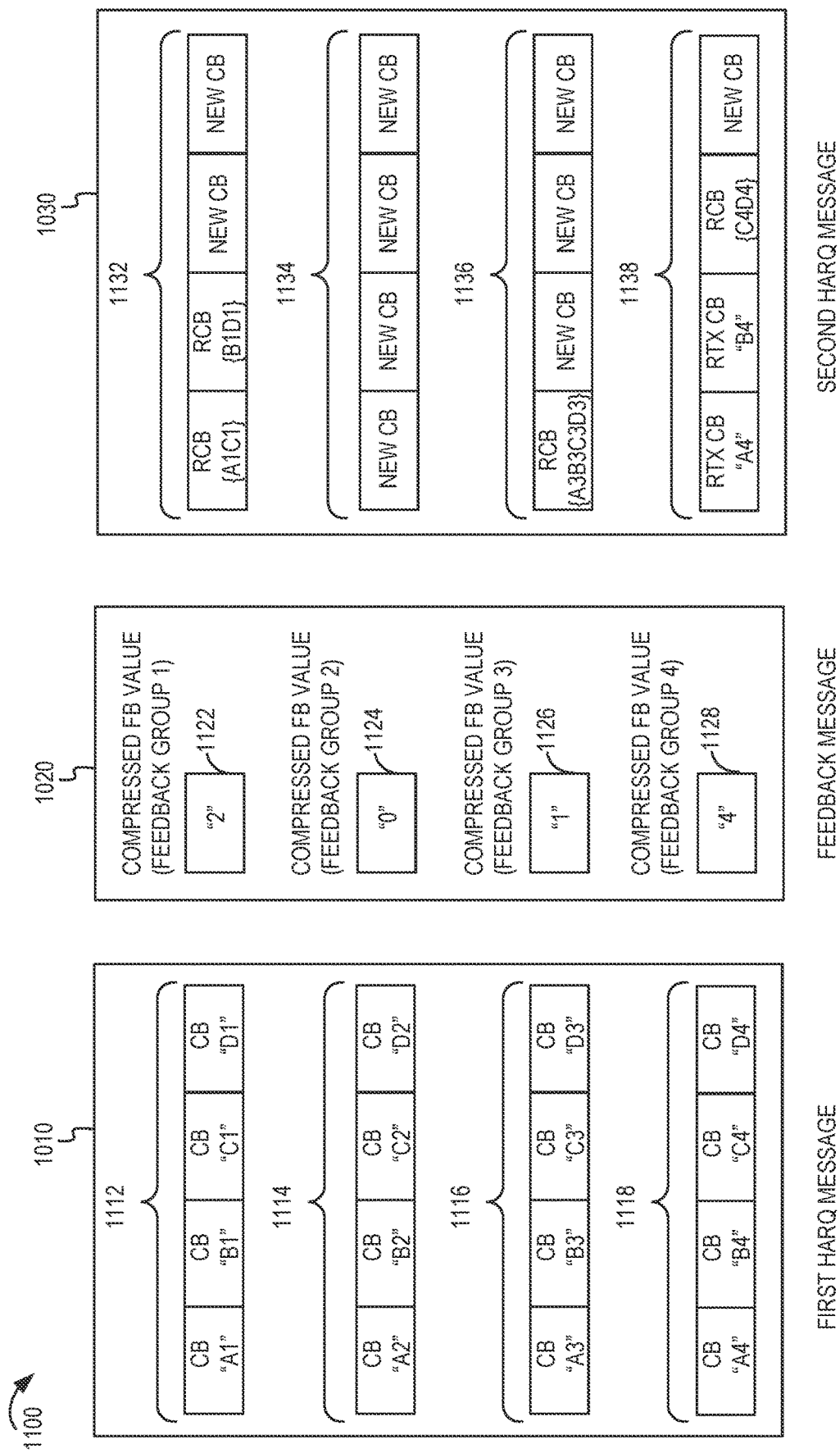
FIG. 11 depicts example contents of some of the HARQ messages described with reference to FIG. 10.

FIG. 11 depicts example contents 1100 of some of the HARQ messages described with reference to FIG. 10. Although illustrated as fields having structure in FIG. 11, the contents of the HARQ messages in FIG. 11 may be scrambled or hashed as part of the physical layer wireless transmission without deviating from the scope of the HARQ processing described herein.

The first HARQ message 1010 may include sixteen (16) codeblocks. When the receiving device processes the first HARQ message 1010, it may capture decoding results in groups based on the feedback group size. In this example, the feedback group size is four (4) and there are four (4) feedback groups 1112, 1114, 1116, and 1118. For reference, the first feedback group 1112 may include four codeblocks (labeled "A1," "B1," "C1," and "D1"). The second feedback group 1114 may include four codeblocks (labeled "A2," "B2," "C2," and "D2"). The third feedback group 1116 may include four codeblocks (labeled "A3," "B3," "C3," and "D3"). The fourth feedback group 1118 may include four codeblocks (labeled "A4," "B4," "C4," and "D4"). The receiving device may attempt decoding of each codeword and determine compressed feedback values to include in the first feedback message 1020. For each feedback group 1112, 1114, 1116, and 1118, the first feedback message 1020 may include a compressed feedback value 1122, 1124, 1126, and 1128, respectively. Merely for illustration, FIG. 11 provides example compressed feedback values that may be determined based on decoding results for the feedback groups. For example, a first compressed feedback value 1122 for the first feedback group 1112 may be "2," a second compressed feedback value 1124 for the second feedback group 1114 may be "0," a third compressed feedback value 1126 for the third feedback group 1116 may be "1," and a fourth compressed feedback value 1128 for the fourth feedback group 1118 may be "4." The compressed feedback values 1122, 1124, 1126, and 1128 may correspond to the example compressed feedback values shown in Table 900 of FIG. 9.

The second HARQ message 1030 may include a mix of retransmission codeblocks, retransmitted codeblocks, or new code blocks depending on the respective retransmission functions associated with each compressed feedback value 1122, 1124, 1126, and 1128. For example, the first four codeblocks 1132 may be based on the retransmission functions associated with the first compressed feedback value 1122 ("2"). According to Table 900 of FIG. 9, there are two retransmission functions resulting in two retransmission codeblocks (illustrated as RCB{A1C1} and RCB{B1D1}). The remaining slots in that group may be populated with new codeblocks (all of which are illustrated as "NEW CB" for brevity). Alternatively, some of the new codeblocks may be null or padding (such as when there is no more user data to communicate in the HARQ session). When the receiving device processes the first four codeblocks 1132, it knows that the first retransmission codeblock should be used with the first receiver function associated with the first compressed feedback value 1122 ("2") and the previous decoding results for that feedback group 1112.

The next four codeblocks 1134 includes four new codeblocks since the second compressed feedback value 1124 ("0") is not associated with any retransmission functions and there were no decoding failures in the second feedback group 1114.

Then, the next four codeblocks 1136 includes a retransmission codeblock (illustrated as RCB{A3B3C3D3}) generated using the retransmission function associated with the third compressed feedback value 1126 ("1"), as well as three new codeblocks. The receiving device processes the retransmission codeblock using the receiver function associated with the third compressed feedback value 1126 ("1") and the previous decoding results for that feedback group 1116.

Finally, the next four codeblocks 1138 includes retransmission data for the original codeblocks (illustrated as RTX CB "A4", RTX CB "B4") and a retransmission codeblock (RCB {C4D4}) and a new code block generated using the retransmission function associated with the fourth compressed feedback value 1128 ("4").

Figure 12:
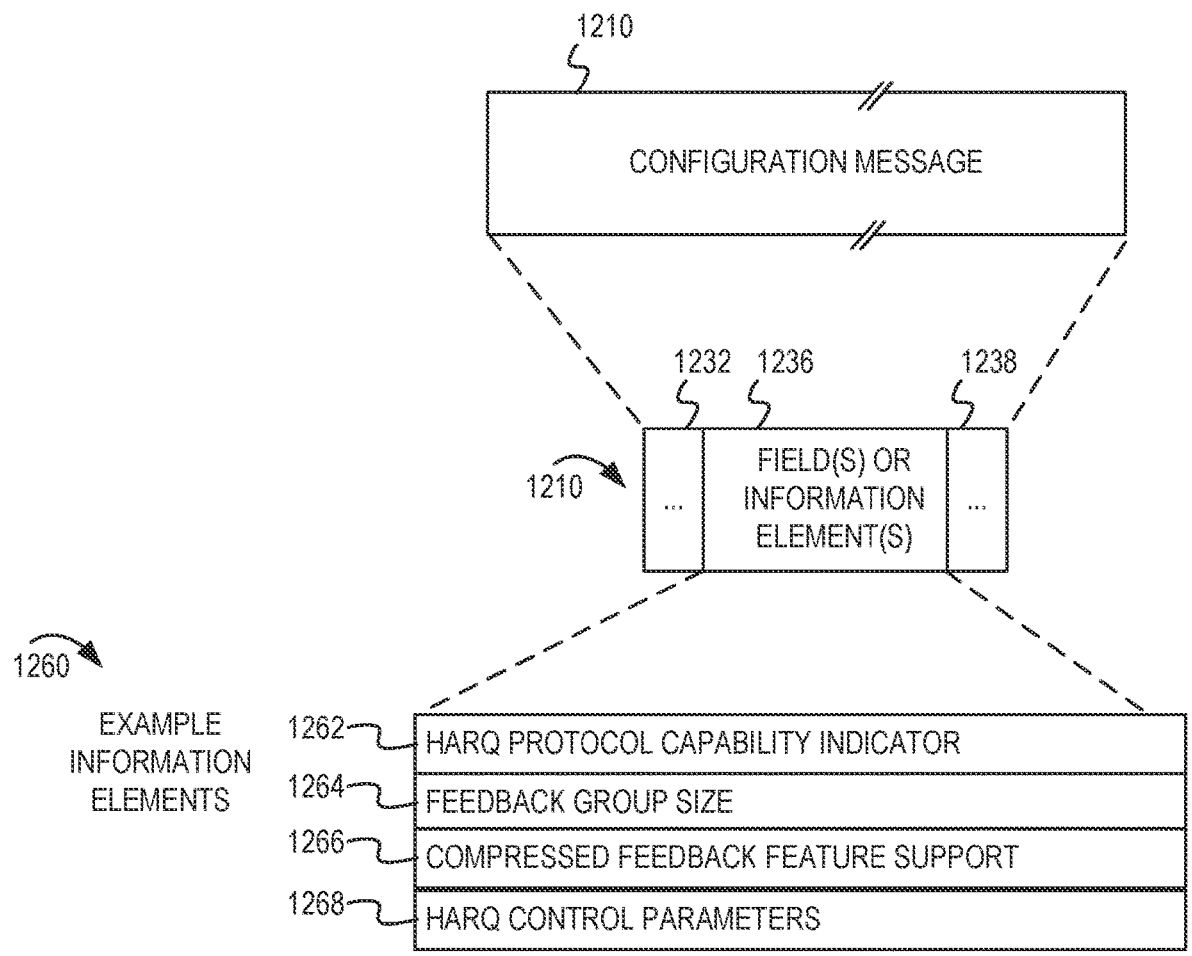
FIG. 12 depicts a conceptual diagram of an example configuration message for use with aspects of this disclosure.

FIG. 12 depicts a conceptual diagram of an example configuration message for use with aspects of this disclosure. For example, the example configuration message 1210 may be sent from a first device to a second device, or vice versa. The configuration message 1210 may be used to communicate the retransmission protocol parameters. The retransmission protocol parameters may be organized or formatted in a variety of ways. The configuration message 1210 may be organized with a message format and may include information elements 1232, 1236, and 1238. Several examples of information elements are illustrated in FIG. 12.

Example information elements 1260 may be sent as part of a retransmission protocol configuration or setup message. In some implementations, the example information elements 1260 may include initial (default) parameters for a retransmission protocol. In some implementations, the example information elements 1260 may include a HARQ protocol capability indicator 1262 to indicate that the device supports the HARQ protocol features in this disclosure. The example information elements 1260 may include a feedback group size 1264, an indicator whether the device supports compressed feedback feature 1266, HARQ control parameters 1268, or any combination thereof.

Figure 13:
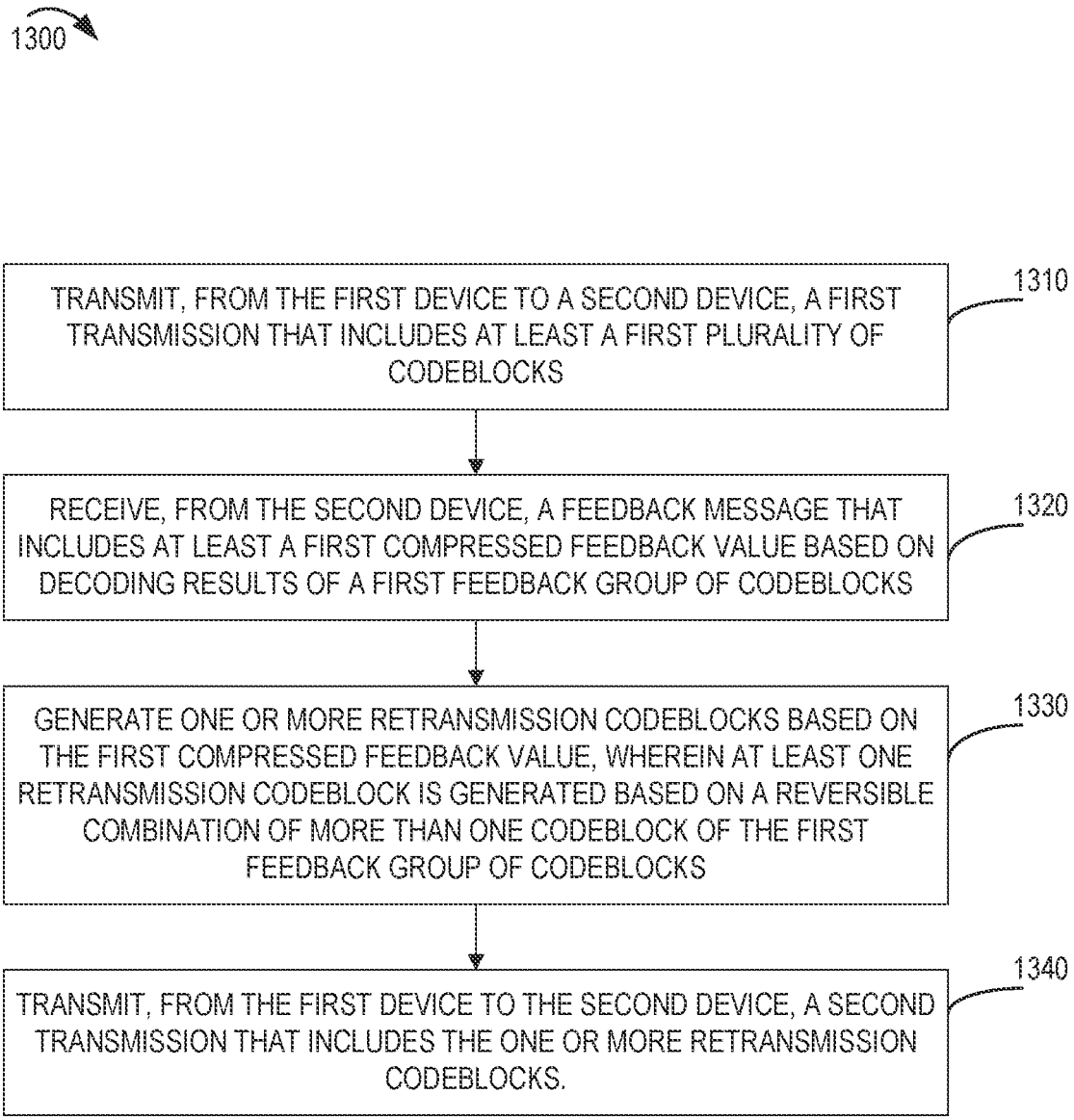
FIG. 13 shows a flowchart illustrating example operations performed by a sending device in a HARQ session.

FIG. 13 shows a flowchart illustrating example operations performed by a sending device in a HARQ session. The operations of the process 1300 may be implemented by a wireless communication device, or any component thereof, such as the first device 110 (or any sending device) described herein. In some implementations, the process 1300 may be performed by a wireless communication device, such as the wireless communication device 1500 described with reference to FIG. 15. For consistency, the example process 1300 is described as being performed by a first device.

In block 1310, the apparatus may transmit, from the first device to a second device, a first transmission that includes at least a first plurality of codeblocks.

In block 1320, the apparatus may receive, from the second device, a feedback message that includes at least a first compressed feedback value based on decoding results of a first feedback group of codeblocks.

In block 1330, the apparatus may generate one or more retransmission codeblocks based on the first compressed feedback value. At least one retransmission codeblock may be generated based on a reversible combination of more than one codeblock of the first feedback group of codeblocks.

In block 1340, the apparatus may transmit, from the first device to the second device, a second transmission that includes the one or more retransmission codeblocks.

Figure 14:
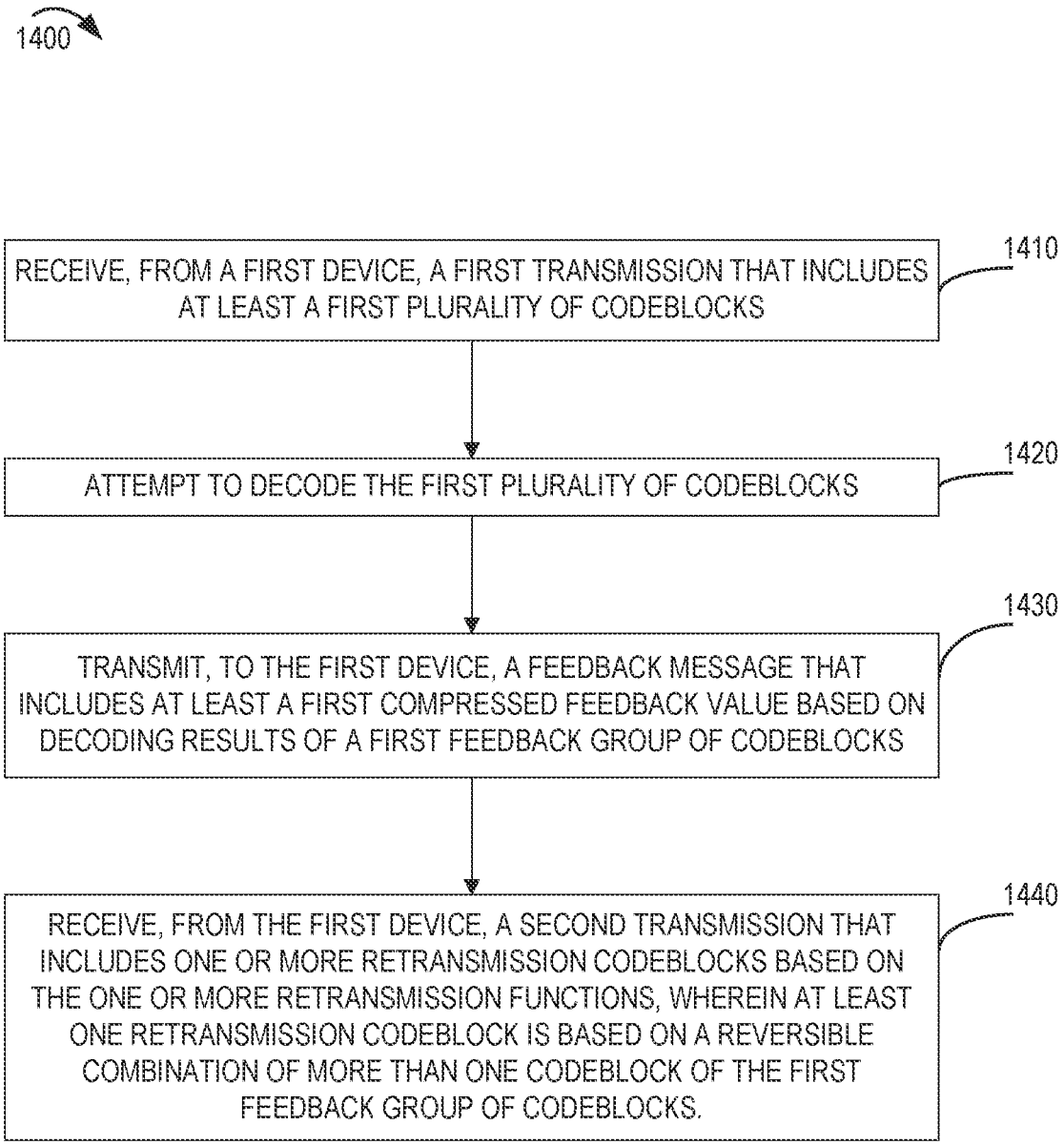
FIG. 14 shows a flowchart illustrating example operations performed by a receiving device in a HARQ session.

FIG. 14 shows a flowchart illustrating example operations performed by a receiving device in a HARQ session. The operations of the process 1400 may be implemented by a wireless communication device, or any component thereof, such as the second device 120 (or any receiving device) described herein. In some implementations, the process 1400 may be performed by a wireless communication device, such as the wireless communication device 1500 described with reference to FIG. 15. For consistency, the example process 1400 is described as being performed by a second device.

In block 1410, the apparatus may receive, from a first device, a first transmission that includes at least a first plurality of codeblocks.

In block 1420, the apparatus may attempt to decode the first plurality of codeblocks.

In block 1430, the apparatus may transmit, to the first device, a feedback message that includes at least a first compressed feedback value based on decoding results of a first feedback group of codeblocks.

In block 1440, the apparatus may receive, from the first device, a second transmission that includes one or more retransmission codeblocks based on the one or more retransmission functions. At least one retransmission codeblock may be based on a reversible combination of more than one codeblock of the first feedback group of codeblocks.

Figure 15:
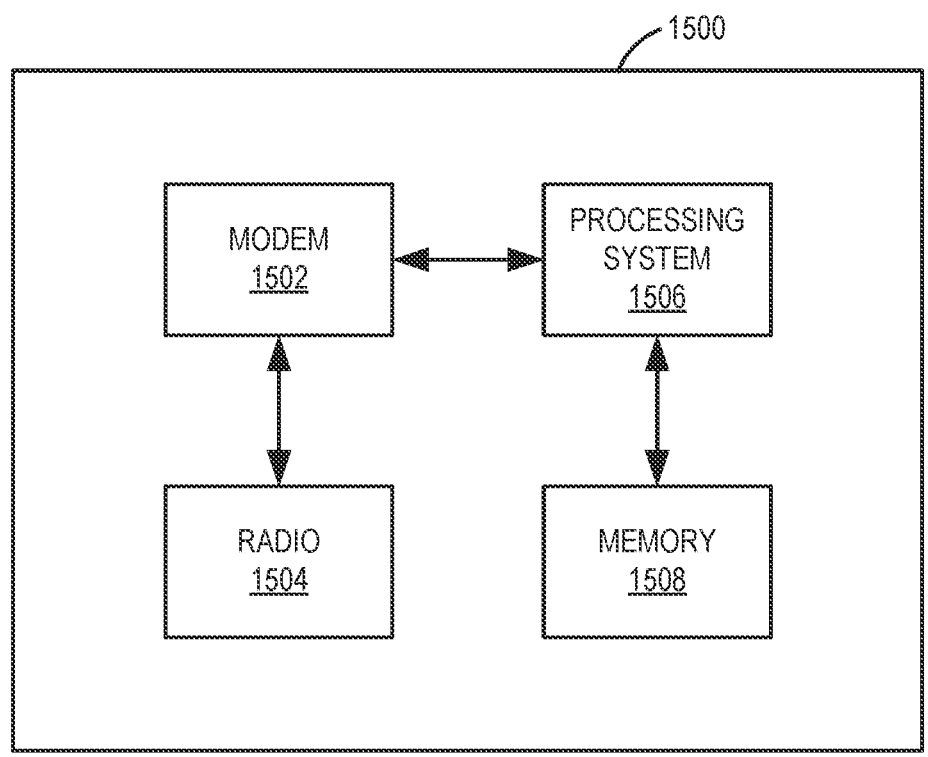
FIG. 15 shows a block diagram of an example wireless communication device that supports the compressed feedback and retransmission techniques of this disclosure.

FIG. 15 shows a block diagram of an example wireless communication device 1500 that supports the compressed feedback and retransmission techniques of this disclosure. The wireless communication device 1500 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication device 1500 may include one or more modems 1502. In some implementations, the one or more modems 1502 (collectively "the modem 1502") may include a WWAN modem (for example, a 3GPP 4G LTE or 5G compliant modem). In some implementations, the wireless communication device 1500 also includes one or more radios (collectively "the radio 1504"). In some implementations, the wireless communication device 1500 further includes one or more processors, processing blocks or processing elements (collectively "the processing system 1506") and one or more memory blocks or elements (collectively "the memory 1508"). In some implementations, the processing system 1506 can include the memory 1508.

The modem 1502 can include an intelligent hardware block or device such as, for example, an application-specific integrated circuit (ASIC) among other possibilities. The modem 1502 is generally configured to implement a PHY layer. For example, the modem 1502 is configured to modulate packets and to output the modulated packets to the radio 1504 for transmission over the wireless medium. The modem 1502 is similarly configured to obtain modulated packets received by the radio 1504 and to demodulate the packets to provide demodulated packets. In addition to a modulator and a demodulator, the modem 1502 may further include digital signal processing (DSP) circuitry, automatic gain control (AGC), a coder, a decoder, a multiplexer and a demultiplexer. For example, while in a transmission mode, data obtained from the processing system 1506 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1504. In implementations involving beamforming, the modulated symbols in the respective spatial streams are precoded via a steering matrix prior to their provision to the IFFT block.

While in a reception mode, digital signals received from the radio 1504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processing system 1506) for processing, evaluation, or interpretation.

The radio 1504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 1500 can include, or be coupled with, multiple transmit antennas (each with a corresponding transmit chain) and multiple receive antennas (each with a corresponding receive chain). The symbols output from the modem 1502 are provided to the radio 1504, which transmits the symbols via the coupled antennas. Similarly, symbols received via the antennas are obtained by the radio 1504, which provides the symbols to the modem 1502.

The processing system 1506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processing system 1506 processes information received through the radio 1504 and the modem 1502, and processes information to be output through the modem 1502 and the radio 1504 for transmission through the wireless medium. In some implementations, the processing system 1506 may generally control the modem 1502 to cause the modem to perform various operations described above.

The memory 1508 can include tangible storage media such as random-access memory (RAM) or read-only memory (ROM), or combinations thereof. The memory 1508 also can store non-transitory processor- or computer-executable software (SW) code containing instructions that, when executed by the processing system 1506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

FIGS. 1-15 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for clarity).

Clause 1. A method for wireless communication by a first device including: transmitting, from the first device to a second device, a first transmission that includes at least a first plurality of codeblocks; receiving, from the second device, a feedback message that includes at least a first compressed feedback value based on decoding results of a first feedback group of codeblocks; generating one or more retransmission codeblocks based on the first compressed feedback value, where at least one retransmission codeblock is generated based on a reversible combination of more than one codeblock of the first feedback group of codeblocks; and transmitting, from the first device to the second device, a second transmission that includes the one or more retransmission codeblocks.

Clause 2. The method of clause 1, where generating the one or more retransmission codeblocks includes: generating at least a first retransmission codeblock using a first retransmission function based on a reversible combination of all codeblocks of a set of codeblocks in the first feedback group.

Clause 3. The method of any one of clauses 1-2, where the first retransmission codeblock enables the second device to obtain retransmission data for a first codeblock of the set of code blocks based on all other codeblocks of the set of codeblocks that the second device successfully decoded from the first transmission.

Clause 4. The method of any one of clauses 2-3, where the reversible combination includes a bitwise exclusive OR (XOR) operation of all codeblocks of the set of codeblocks.

Clause 5. The method of any one of clauses 1-4, where the first retransmission codeblock and all codeblocks of the set of codeblocks have a same codeblock size.

Clause 6. The method of any one of clauses 1-5, where the first compressed feedback value is a selected one from among a plurality of potential compressed feedback values associated with potential combinations of decoding results for codeblocks in the first feedback group.

Clause 7. The method of any one of clauses 1-6, where the first compressed feedback value is associated with a combination of decoding results that includes a failure of the second device to decode a first codeblock in any position of the set of codeblocks and a success of the second device to decode other codeblocks of the set of codeblocks.

Clause 8. The method of any one of clauses 1-7, further including: receiving a plurality of compressed feedback values corresponding to a plurality of feedback groups in the first transmission.

Clause 9. The method of any one of clauses 1-8, where a feedback group size of the plurality of feedback groups is four codeblocks per feedback group, and where each feedback value is selected from among seven potential compressed feedback values that are associated with sixteen potential combinations of decoding results for the four codeblocks in each feedback group such that at least one potential compressed feedback value is associated with more than one potential combination of decoding results.

Clause 10. The method of any one of clauses 1-9, further including: selecting a feedback group size based on: a quantity of failed codeblocks in a previous transmission, a quantity of codeblocks per orthogonal frequency division multiplexing (OFDM) symbol, a system configuration parameter, a user configuration parameter, a specified value in a technical standard, or any combination thereof.

Clause 11. The method of any one of clauses 1-10, where transmitting the second transmission includes: transmitting the one or more retransmission codeblocks as well as a second plurality of codeblocks that were not included in the first transmission.

Clause 12. The method of any one of clauses 1-11, where the first transmission, the feedback message, and the second transmission are part of a hybrid automatic repeat request (HARQ) session between the first device and the second device.

Clause 13. The method of any one of clauses 1-12, further including: determining one or more retransmission functions associated with the first compressed feedback value, each retransmission function associated with different defined sets of codeblocks within the first feedback group.

Clause 14. A method for wireless communication by a second device including: receiving, from a first device, a first transmission that includes at least a first plurality of codeblocks; attempting to decode the first plurality of codeblocks; transmitting, to the first device, a feedback message that includes at least a first compressed feedback value based on decoding results of a first feedback group of codeblocks; and receiving, from the first device, a second transmission that includes one or more retransmission codeblocks based on the one or more retransmission functions, where at least one retransmission codeblock is based on a reversible combination of more than one codeblock of the first feedback group of codeblocks.

Clause 15. The method of clause 14, where the decoding results of the first feedback group include a failure to decode a first codeblock of a set of codeblocks in the first feedback group and successful decoding other codeblocks of the set of codeblocks.

Clause 16. The method of any one of clauses 14-15, where the one or more retransmission codeblocks include at least a first retransmission codeblock generated by a first retransmission function based on a reversible combination of all codeblocks of the set of codeblocks in the first feedback group.

Clause 17. The method of any one of clauses 14-16, further including: obtaining retransmission data for the first codeblock using an operation on the first retransmission codeblock based on all other codeblocks of the set of codeblocks that were successfully decoded from the first transmission.

Clause 18. The method of any one of clauses 14-17, further including: selecting which operation to use on the first retransmission codeblock based on which codeblock in the set of codeblocks is the first codeblock that failed to decode from the first transmission.

Clause 19. The method of any one of clauses 14-18, where the operation includes a sign flip of logarithm likelihood ratios (LLRs) of the first retransmission codeblock based on LLRs of all other codeblocks of the set of codeblocks that were successfully decoded from the first transmission.

Clause 20. The method of any one of clauses 14-19, further including: decoding the first codeblock using the retransmission data obtained from the first retransmission codeblock.

Clause 21. The method of any one of clauses 14-20, where decoding the first codeblock includes combining logarithm likelihood ratios (LLRs) of the retransmission data with LLRs of the first codeblock from the first transmission using either an incremental redundancy scheme or a Chase combining technique.

Clause 22. The method of any one of clauses 14-21, further including: selecting the first compressed feedback value from among a plurality of potential compressed feedback values associated with potential combinations of decoding results for codeblocks in the first feedback group.

Clause 23. The method of any one of clauses 14-22, further including: transmitting a plurality of compressed feedback values corresponding to a plurality of feedback groups in the first transmission.

Clause 24. The method of any one of clauses 14-23, where a feedback group size of the plurality of feedback groups is four codeblocks per feedback group, and where each feedback value is selected from among seven potential compressed feedback values that are associated with sixteen potential combinations of decoding results for the four codeblocks in each feedback group such that at least one potential compressed feedback value is associated with more than one potential combination of decoding results.

Clause 25. An apparatus of a first device including: at least one modem configured to: output, to a second device, a first transmission that includes at least a first plurality of codeblocks, and obtain, from the second device, a feedback message that includes at least a first compressed feedback value based on decoding results of a first feedback group of codeblocks; a processing system configured to generate one or more retransmission codeblocks based on the first compressed feedback value, where at least one retransmission codeblock is generated based on a reversible combination of more than one codeblock of the first feedback group of codeblocks; and the at least one modem further configured to output, to the second device, a second transmission that includes the one or more retransmission codeblocks.

Clause 26. The apparatus of clause 25, where the one or more retransmission codeblocks includes at least a first retransmission codeblock, and where the processing system is configured to generate the first retransmission codeblock using a first retransmission function based on a reversible combination of all codeblocks of a set of codeblocks in the first feedback group.

Clause 27. The apparatus of any one of clauses 25-26, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

Clause 28. An apparatus for wireless communication by a second device including: at least one modem configured to obtain, from a first device, a first transmission that includes at least a first plurality of codeblocks; a processing system configured to attempt to decode the first plurality of codeblocks; the at least one modem configured to output, to the first device, a feedback message that includes at least a first compressed feedback value based on decoding results of a first feedback group of codeblocks; and the at least one modem configured to obtain, from the first device, a second transmission that includes one or more retransmission codeblocks based on the one or more retransmission functions, where at least one retransmission codeblock is based on a reversible combination of more than one codeblock of the first feedback group of codeblocks.

Clause 29. The apparatus of clause 28, where the decoding results of the first feedback group include a failure to decode a first codeblock of a set of codeblocks in the first feedback group and successful decoding other codeblocks of the set of codeblocks, where the one or more retransmission codeblocks include at least a first retransmission codeblock generated by a first retransmission function based on a reversible combination of all codeblocks of the set of codeblocks in the first feedback group, and where the processing system configured to: obtain retransmission data for the first codeblock using an operation on the first retransmission codeblock based on all other codeblocks of the set of codeblocks that were successfully decoded from the first transmission, where the operation is selected based on which codeblock in the set of codeblocks is the first codeblock that failed to decode from the first transmission; and decode the first codeblock using the retransmission data obtained from the first retransmission codeblock.

Clause 30. The apparatus of any one of clauses 28-29, further including: at least one transceiver coupled to the at least one modem; at least one antenna coupled to the at least one transceiver to wirelessly transmit signals output from the at least one transceiver and to wirelessly receive signals for input into the at least one transceiver; and a housing that encompasses at least the processing system, the at least one modem, the at least one transceiver, and at least a portion of the at least one antenna.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

As used herein, the terms "user equipment", "wireless communication device", "mobile communication device", "communication device", or "mobile device" refer to any one or all of cellular telephones, smartphones, portable computing devices, personal or mobile multi-media players, laptop computers, tablet computers, smartbooks, Internet-of-Things (IoT) devices, palm-top computers, wireless electronic mail receivers, multimedia Internet enabled cellular telephones, wireless gaming controllers, display sub-systems, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, or other information used to identify or authenticate a mobile communication device on a network and enable a communication service with the network. Because the information stored in a SIM enables the mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another. A SIM used in various examples may contain user account information, an international mobile subscriber identity (IMSI), a set of SIM application toolkit (SAT) commands, and storage space for phone book contacts. A SIM card may further store home identifiers (such as, a System Identification Number (SID)/Network Identification Number (NID) pair, a Home Public Land Mobile Number (HPLMN) code, among other examples) to indicate the SIM card network operator provider. An Integrated Circuit Card Identity (ICCID) SIM serial number may be printed on the SIM card for identification. However, a SIM may be implemented within a portion of memory of the mobile communication device, and thus need not be a separate or removable circuit, chip or card.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a first device comprising:

transmitting, to a second device, a first transmission that includes at least a first plurality of codeblocks;

receiving, from the second device, a feedback message that includes a plurality of compressed feedback values in accordance with decoding results of a plurality of feedback groups of codeblocks associated with the first plurality of codeblocks;

generating one or more retransmission codeblocks associated with the plurality of compressed feedback values, at least one of the one or more retransmission codeblocks being generated in accordance with a reversible combination of more than one codeblock of the plurality of feedback groups of codeblocks; and transmitting, to the second device, a second transmission that includes the one or more retransmission codeblocks.

2. The method of claim 1, wherein generating the one or more retransmission codeblocks includes:

generating at least a first retransmission codeblock using a first retransmission function in accordance with a reversible combination of all codeblocks of a set of codeblocks in the plurality of feedback groups.

3. The method of claim 2, wherein the first retransmission codeblock enables the second device to obtain retransmission data for a first codeblock of the set of codeblocks in accordance with all other codeblocks of the set of codeblocks that the second device successfully decoded from the first transmission.

4. The method of claim 2, wherein the reversible combination includes a bitwise exclusive OR (XOR) operation of all codeblocks of the set of codeblocks.

5. The method of claim 2, wherein the first retransmission codeblock and all codeblocks of the set of codeblocks have a same codeblock size.

6. The method of claim 2, wherein the plurality of compressed feedback values are selected from among a plurality of potential compressed feedback values associated with potential combinations of decoding results for codeblocks in the plurality of feedback groups.

7. The method of claim 6, wherein the plurality of compressed feedback values are associated with a combination of decoding results that includes a failure of the second device to decode a first codeblock in any position of the set of codeblocks and a success of the second device to decode other codeblocks of the set of codeblocks.

8. The method of claim 1, wherein a feedback group size of the plurality of feedback groups is four codeblocks per feedback group, and wherein each feedback value is selected from among seven potential compressed feedback values that are associated with sixteen potential combinations of decoding results for the four codeblocks in each feedback group such that at least one potential compressed feedback value is associated with more than one potential combination of decoding results.

9. The method of claim 1, further comprising:

selecting a feedback group size associated with at least one member of a group consisting of:
  a quantity of failed codeblocks in a previous transmission,
  a quantity of codeblocks per orthogonal frequency division multiplexing (OFDM) symbol,
  a system configuration parameter,
  a user configuration parameter, and
  a specified value in a technical standard.

10. The method of claim 1, wherein transmitting the second transmission includes:

transmitting the one or more retransmission codeblocks as well as a second plurality of codeblocks that were not included in the first transmission.

11. The method of claim 1, wherein the first transmission, the feedback message, and the second transmission are part of a hybrid automatic repeat request (HARQ) session between the first device and the second device.

12. The method of claim 1, further comprising:

determining one or more retransmission functions associated with the plurality of compressed feedback values, each retransmission function associated with different defined sets of codeblocks within the plurality of feedback groups.

13. A method for wireless communication by a second device comprising:

receiving, from a first device, a first transmission that includes at least a first plurality of codeblocks;

attempting to decode the first plurality of codeblocks;

transmitting a feedback message that includes a plurality of compressed feedback values in accordance with decoding results of a plurality of feedback groups of codeblocks associated with the first plurality of codeblocks; and receiving, from the first device, a second transmission that includes one or more retransmission codeblocks in accordance with one or more retransmission functions, at least one of the one or more retransmission codeblocks being in accordance with a reversible combination of more than one codeblock of the plurality of feedback groups of codeblocks.

14. The method of claim 13, wherein the decoding results of the plurality of feedback groups include a failure to decode a first codeblock of a set of codeblocks in the plurality of feedback groups and successful decoding other codeblocks of the set of codeblocks.

15. The method of claim 14, wherein the one or more retransmission codeblocks include at least a first retransmission codeblock generated by a first retransmission function in accordance with a reversible combination of all codeblocks of the set of codeblocks in the plurality of feedback groups.

16. The method of claim 15, further comprising:

obtaining retransmission data for the first codeblock using an operation on the first retransmission codeblock associated with all other codeblocks of the set of codeblocks that were successfully decoded from the first transmission.

17. The method of claim 16, further comprising:

selecting which operation to use on the first retransmission codeblock in accordance with which codeblock in the set of codeblocks is the first codeblock that failed to decode from the first transmission.

18. The method of claim 16, wherein the operation includes a sign flip of logarithm likelihood ratios (LLRs) of the first retransmission codeblock in accordance with LLRs of all other codeblocks of the set of codeblocks that were successfully decoded from the first transmission.

19. The method of claim 16, further comprising:

decoding the first codeblock using the retransmission data obtained from the first retransmission codeblock.

20. The method of claim 17, wherein decoding the first codeblock includes combining logarithm likelihood ratios (LLRs) of the retransmission data with LLRs of the first codeblock from the first transmission using either an incremental redundancy scheme or a Chase combining technique.

21. The method of claim 13, further comprising:

selecting a first compressed feedback value from among a plurality of potential compressed feedback values associated with potential combinations of decoding results for codeblocks in the plurality of feedback groups.

22. The method of claim 13, wherein a feedback group size of the plurality of feedback groups is four codeblocks per feedback group, and wherein each feedback value is selected from among seven potential compressed feedback values that are associated with sixteen potential combinations of decoding results for the four codeblocks in each feedback group such that at least one potential compressed feedback value is associated with more than one potential combination of decoding results.

23. An apparatus of a first device comprising:
at least one modem configured to:
output a first transmission that includes at least a first plurality of codeblocks, and
obtain, from a second device, a feedback message that includes a plurality of compressed feedback values in accordance with decoding results of a plurality of feedback groups of codeblocks associated with the first plurality of codeblocks; and
a processing system configured to generate one or more retransmission codeblocks associated with the plurality of compressed feedback values, at least one of the one or more retransmission codeblocks being generated in accordance with a reversible combination of more than one codeblock of the plurality of feedback groups of codeblocks;
the at least one modem further configured to output a second transmission that includes the one or more retransmission codeblocks.

24. The apparatus of claim 23, wherein the one or more retransmission codeblocks includes at least a first retransmission codeblock, and wherein the processing system is configured to generate the first retransmission codeblock using a first retransmission function in accordance with a reversible combination of all codeblocks of a set of codeblocks in the plurality of feedback groups.

25. The apparatus of claim 23, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses at least the processing system, the at least one modem, the at least one transceiver, and at least a portion of the at least one antenna.

26. An apparatus for wireless communication by a second device comprising:
at least one modem configured to obtain a first transmission that includes at least a first plurality of codeblocks;
a processing system configured to attempt to decode the first plurality of codeblocks;
the at least one modem configured to output, to a first device, a feedback message that includes a plurality of compressed feedback values in accordance with decoding results of a plurality of feedback groups of codeblocks associated with the first plurality of codeblocks; and
the at least one modem configured to obtain a second transmission that includes one or more retransmission codeblocks in accordance with one or more retransmission functions, at least one of the one or more retransmission codeblocks being in accordance with a reversible combination of more than one codeblock of the plurality of feedback groups of codeblocks.

27. The apparatus of claim 26,
wherein the decoding results of the plurality of feedback groups include a failure to decode a first codeblock of a set of codeblocks in the plurality of feedback groups and successful decoding other codeblocks of the set of codeblocks,
wherein the one or more retransmission codeblocks include at least a first retransmission codeblock generated by a first retransmission function in accordance with a reversible combination of all codeblocks of the set of codeblocks in the plurality of feedback groups, and
wherein the processing system configured to:
obtain retransmission data for the first codeblock using an operation on the first retransmission codeblock associated with all other codeblocks of the set of codeblocks that were successfully decoded from the first transmission, wherein the operation is selected in accordance with which codeblock in the set of codeblocks is the first codeblock that failed to decode from the first transmission; and
decode the first codeblock using the retransmission data obtained from the first retransmission codeblock.

28. The apparatus of claim 26, further comprising:
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses at least the processing system, the at least one modem, the at least one transceiver, and at least a portion of the at least one antenna.

* * * * *